(12) United States Patent
Petranovich et al.

(10) Patent No.: US 7,376,075 B1
(45) Date of Patent: May 20, 2008

(54) CIRCULAR CONSTELLATIONS WITH COHERENT GAIN/DIFFERENTIAL PHASE AND PILOTS

(75) Inventors: James E. Petranovich, San Diego, CA (US); Yiorgos M. Peponides, Encinitas, CA (US); Steven H. Gardner, San Diego, CA (US); Cenk Kose, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 662 days.

(21) Appl. No.: 10/949,861

(22) Filed: Sep. 24, 2004

Related U.S. Application Data

(60) Provisional application No. 60/506,566, filed on Sep. 26, 2003.

(51) Int. Cl.
*H04J 9/00* (2006.01)
(52) U.S. Cl. ...................... 370/208; 370/205
(58) Field of Classification Search ................ 370/204, 370/208, 335, 342, 441, 474, 511, 514
See application file for complete search history.

(56) References Cited

U.S. PATENT DOCUMENTS 6,026,120 A * 2/2000 Betts ........................ 375/261
6,252,854 B1 * 6/2001 Hortensius et al. ......... 370/252
6,389,065 B1 * 5/2002 McGhee ..................... 375/222
6,735,221 B1 * 5/2004 Cherubini ................... 370/485
6,993,083 B1 * 1/2006 Shirakata et al. ........... 375/260
7,020,073 B2 * 3/2006 Kadous et al. .............. 370/208

FOREIGN PATENT DOCUMENTS

JP    2002-344414    * 11/2001

* cited by examiner

*Primary Examiner*—Ricky Q. Ngo
*Assistant Examiner*—Dady Chery
(74) *Attorney, Agent, or Firm*—Farjami & Farjami LLP

(57) ABSTRACT

The modulation method and system of the presented herein involves mapping data onto a constellations comprising a set of concentric circles in a two-dimensional plane, one dimension for the amplitude and one for the phase. The phase dimension is coded differentially, while the amplitude dimension is coded coherently. The circles in each constellation may contain equal number of points, and in other embodiments more points may be used on the outer circles. The data may be coded with dual Trellis codes, one code for the phase data and another code for the amplitude data.

19 Claims, 19 Drawing Sheets

$r_0 = \sqrt{1 - \lambda^2}$ $r_1 = \sqrt{1 + \lambda^2}$

| Tone_0 | $A_0 \exp(j\phi_0)$ | $B_0 \exp(j(\phi_0+\phi_2))$ | $A_2 \exp(j(\phi_0+\phi_2+\phi_4))$ | $B_2 \exp(j(\phi_0+\phi_2+\phi_4+\phi_6))$ |
|---|---|---|---|---|
| Tone_1 | $A_1 \exp(j\phi_1)$ | $B_1 \exp(j(\phi_1+\phi_3))$ | $A_3 \exp(j(\phi_1+\phi_3+\phi_5))$ | $B_3 \exp(j(\phi_1+\phi_3+\phi_5+\phi_7))$ |

Fig. 12

| Bits/symbol | Modulation | Phase delta |
|---|---|---|
| 1 | DBPSK | $\Delta\phi = 180° \cdot D[0]$ |
| 2 | DQPSK | $\Delta\phi = 90° \cdot (D[0] + 2 \cdot D[1])$ |
| 3 | 8DPSK | $\Delta\phi = 45° \cdot (D[0] + 2 \cdot D[1] + 4 \cdot D[2])$ |
| 4 | 16DPSK | $\Delta\phi = 22.5° \cdot (D[0] + 2 \cdot D[1] + 4 \cdot D[2] + 8 \cdot D[3])$ |
| 5 | 32DPSK | $\Delta\phi = 11.25° \cdot (D[0] + 2 \cdot D[1] + 4 \cdot D[2] + 8 \cdot D[3] + 16 \cdot D[4])$ |
| 6 | 64DPSK | $\Delta\phi = 5.625° \cdot (D[0] + 2 \cdot D[1] + 4 \cdot D[2] + 8 \cdot D[3] + 16 \cdot D[4] + 32 \cdot D[5])$ |

Fig. 13

| Data Word D | Ring | Relative Ring Amplitude | Number of Phase Deltas | Phase Delta as a function of Data |
|---|---|---|---|---|
| D[2]=0 | 1 | 1 | 4 | $\Delta\phi = 90° \cdot (D[0] + 2 \cdot D[1])$ |
| D[2]=1 | 2 | 2.415 | 4 | $\Delta\phi = 90° \cdot (D[0] + 2 \cdot D[1])$ |

| Data Word D | Ring | Relative Ring Amplitude | Number of Phase Deltas | Phase Delta as a function of Data |
|---|---|---|---|---|
| D[3]=0 | 1 | 1 | 8 | $\Delta\phi = 45° \cdot (D[0] + 2 \cdot D[1] + 4 \cdot D[2])$ |
| D[3]=1 | 2 | 1.765 | 8 | $\Delta\phi = 45° \cdot (D[0] + 2 \cdot D[1] + 4 \cdot D[2])$ |

| Data Word D | Ring | Relative Ring Amplitude | Number of Phase Deltas | Phase Delta as a function of Data |
|---|---|---|---|---|
| D[4:3]=00 | 1 | 1 | 8 | $\Delta\phi = 45° \cdot (D[0] + 2 \cdot D[1] + 4 \cdot D[2])$ |
| D[4:3]=01 | 2 | 1.765 | 8 | $\Delta\phi = 45° \cdot (D[0] + 2 \cdot D[1] + 4 \cdot D[2])$ |
| D[4:3]=1x | 3 | 2.531 | 16 | $\Delta\phi = 22.5° \cdot$ $(-0.5 + D[0] + 2 \cdot D[1] + 4 \cdot D[2] + 8 \cdot D[3])$ |

| Data Word D | Ring | Relative Ring Amplitude | Number of Phase Deltas | Phase Delta as a function of Data |
|---|---|---|---|---|
| D[5:3]=000 | 1 | 1 | 8 | $\Delta\phi = 45° \cdot (D[0] + 2 \cdot D[1] + 4 \cdot D[2])$ |
| D[5:3]=001 | 2 | 1.765 | 8 | $\Delta\phi = 45° \cdot (D[0] + 2 \cdot D[1] + 4 \cdot D[2])$ |
| D[5:3]=01x | 3 | 2.531 | 16 | $\Delta\phi = 22.5° \cdot (-0.5 + D[0] + 2 \cdot D[1] + 4 \cdot D[2] + 8 \cdot D[3])$ |
| D[5:3]=10x | 4 | 3.297 | 16 | $\Delta\phi = 22.5° \cdot (-0.5 + D[0] + 2 \cdot D[1] + 4 \cdot D[2] + 8 \cdot D[3])$ |
| D[5:3]=11x | 5 | 4.063 | 16 | $\Delta\phi = 22.5° \cdot (-0.5 + D[0] + 2 \cdot D[1] + 4 \cdot D[2] + 8 \cdot D[3])$ |

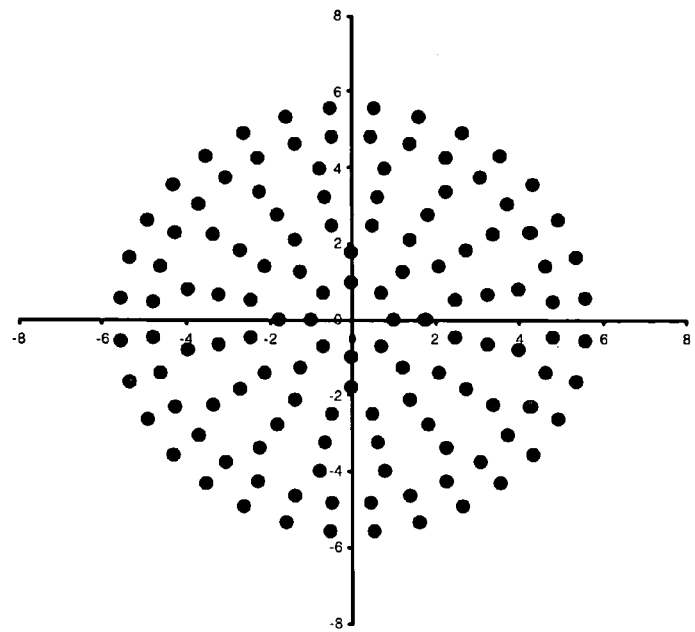

| Data Word D | Ring | Relative Ring Amplitude | Number of Phase Deltas | Phase Delta as a function of Data |
|---|---|---|---|---|
| D[6:3]=0000 | 1 | 1 | 8 | $\Delta\phi = 45° \cdot (D[0] + 2 \cdot D[1] + 4 \cdot D[2])$ |
| D[6:3]=0001 | 2 | 1.765 | 8 | $\Delta\phi = 45° \cdot (D[0] + 2 \cdot D[1] + 4 \cdot D[2])$ |
| D[6:3]=001x | 3 | 2.531 | 16 | $\Delta\phi = 22.5° \cdot (-0.5 + D[0] + 2 \cdot D[1] + 4 \cdot D[2] + 8 \cdot D[3])$ |
| D[6:3]=010x | 4 | 3.297 | 16 | $\Delta\phi = 22.5° \cdot (-0.5 + D[0] + 2 \cdot D[1] + 4 \cdot D[2] + 8 \cdot D[3])$ |
| D[6:3]=011x | 5 | 4.063 | 16 | $\Delta\phi = 22.5° \cdot (-0.5 + D[0] + 2 \cdot D[1] + 4 \cdot D[2] + 8 \cdot D[3])$ |
| D[6:3]=11xx | 6 | 4.829 | 32 | $\Delta\phi = 11.25° \cdot$ $(-1.5 + D[0] + 2 \cdot D[1] + 4 \cdot D[2] + 8 \cdot D[3] + 16 \cdot D[4])$ |
| D[6:3]=10xx | 7 | 5.595 | 32 | $\Delta\phi = 11.25° \cdot$ $(-1.5 + D[0] + 2 \cdot D[1] + 4 \cdot D[2] + 8 \cdot D[3] + 16 \cdot D[4])$ |

Fig. 18

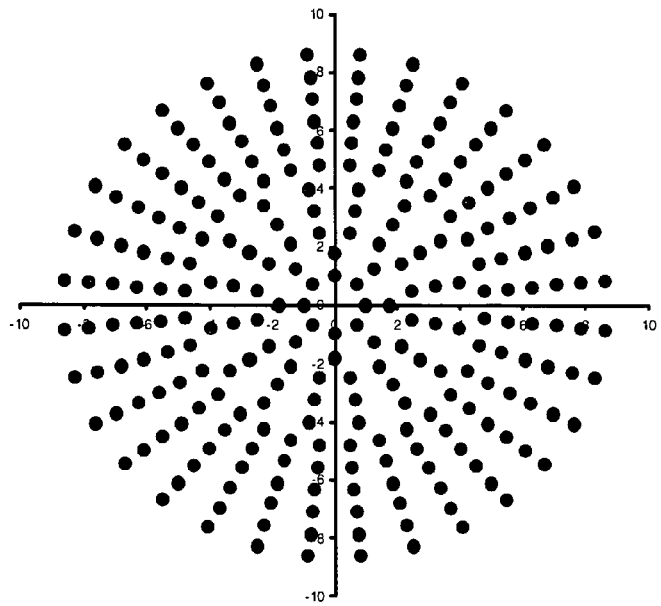

| Data Word D | Ring | Relative Ring Amplitude | Number of Phase Deltas | Phase Delta as a function of Data |
|---|---|---|---|---|
| D[7:3]=00000 | 1 | 1 | 8 | $\Delta\phi = 45° \cdot (D[0] + 2 \cdot D[1] + 4 \cdot D[2])$ |
| D[7:3]=00001 | 2 | 1.765 | 8 | $\Delta\phi = 45° \cdot (D[0] + 2 \cdot D[1] + 4 \cdot D[2])$ |
| D[7:3]=0001x | 3 | 2.531 | 16 | $\Delta\phi = 22.5° \cdot (-0.5 + D[0] + 2 \cdot D[1] + 4 \cdot D[2] + 8 \cdot D[3])$ |
| D[7:3]=0010x | 4 | 3.297 | 16 | $\Delta\phi = 22.5° \cdot (-0.5 + D[0] + 2 \cdot D[1] + 4 \cdot D[2] + 8 \cdot D[3])$ |
| D[7:3]=0011x | 5 | 4.063 | 16 | $\Delta\phi = 22.5° \cdot (-0.5 + D[0] + 2 \cdot D[1] + 4 \cdot D[2] + 8 \cdot D[3])$ |
| D[7:3]=011xx | 6 | 4.829 | 32 | $\Delta\phi = 11.25° \cdot$ $(-1.5 + D[0] + 2 \cdot D[1] + 4 \cdot D[2] + 8 \cdot D[3] + 16 \cdot D[4])$ |
| D[7:3]=010xx | 7 | 5.595 | 32 | $\Delta\phi = 11.25° \cdot$ $(-1.5 + D[0] + 2 \cdot D[1] + 4 \cdot D[2] + 8 \cdot D[3] + 16 \cdot D[4])$ |
| D[7:3]=011xx | 8 | 6.361 | 32 | $\Delta\phi = 11.25° \cdot$ $(-1.5 + D[0] + 2 \cdot D[1] + 4 \cdot D[2] + 8 \cdot D[3] + 16 \cdot D[4])$ |
| D[7:3]=111xx | 9 | 7.126 | 32 | $\Delta\phi = 11.25° \cdot$ $(-1.5 + D[0] + 2 \cdot D[1] + 4 \cdot D[2] + 8 \cdot D[3] + 16 \cdot D[4])$ |
| D[7:3]=101xx | 10 | 7.893 | 32 | $\Delta\phi = 11.25° \cdot$ $(-1.5 + D[0] + 2 \cdot D[1] + 4 \cdot D[2] + 8 \cdot D[3] + 16 \cdot D[4])$ |
| D[7:3]=100xx | 11 | 8.654 | 32 | $\Delta\phi = 11.25° \cdot$ $(-1.5 + D[0] + 2 \cdot D[1] + 4 \cdot D[2] + 8 \cdot D[3] + 16 \cdot D[4])$ |

Fig. 19

CIRCULAR CONSTELLATIONS WITH COHERENT GAIN/DIFFERENTIAL PHASE AND PILOTS

RELATED APPLICATIONS

This application claims priority from U.S. Provisional Application No. 60/506,566, filed on Sep. 26, 2003, herein incorporated by reference. The following U.S. patent applications are also incorporated by reference in their entireties and made part of the present application:

U.S. patent application Ser. No. 10/950,262, titled "Frame Structure for OFDM Signaling, Including Beacons and Traffic," filed concurrently with the present application;

U.S. patent application Ser. No. 10/950,261, titled "MAC Structure with Packet-Quasi-Static Blocks and ARQ," filed concurrently with the present application;

U.S. patent application Ser. No. 10/950,063, titled "Broadcast with Redundant Coding," filed concurrently with the present application; and U.S. patent application Ser. No. 10/949,956, titled "Channel Sounding and Channel Analysis," filed concurrently with the present application.

BACKGROUND OF THE INVENTION

1. Field of the Invention

The present invention relates generally to communication over Ethernet-Class network and, more specifically to encoding methods for robust communication over noisy communications media.

2. Background

For transmission of digital signals some form of modulation is necessary to convert bit streams into an electrical waveform suitable for transmission over a communication channel. Modulation is used to minimize the effects of noise, match the frequency spectrum of the transmitted signal with channel characteristics and overcome some equipment limitations.

Modulation means to vary or change. To communicate a data signal over a communication channel, the data signal is impressed upon a constant wave called a carrier by varying or modulating this radio wave or carrier. Different modulation techniques, such as Amplitude Modulation (AM), Frequency Modulation (FM), Pulse Code Modulation (PCM) and so on, represent different ways to shape or form carrier waves.

Some simple and basic modulation techniques include Amplitude Shift Keying (ASK), Phase Shift Keying (PSK) and Frequency Shift Keying (FSK). Amplitude modulation represents the bits of information by changing a continuous carrier tone, where a continuous carrier is used to represent a zero, and a modulated signal is used to represent a one. In PSK modulation, the phase is shifted for the two different states. The major difference between ASK and PSK modulation schemes is that ASK is a linear modulation scheme, whereas PSK is a nonlinear scheme. FSK, on the other hand, consists of shifting the frequency of a sinusoidal carrier from a mark frequency to a space frequency. FSK is identical to modulating an FM carrier with a binary digital signal. FSK is the least susceptible to distortions during transmission. Because there are many different frequencies that could be chosen, there are many variations of FSK modulation, which can be defined by modulation indices.

Today, digital multimedia applications create an ever-increasing demand for broadband communication systems. Although the technical requirements for related products are quite high, the solutions must remain affordable to implement for consumer products. Orthogonal Frequency Division Multiplexing (OFDM) is a method that allows transmission of high data rates over extremely hostile channels at a comparable low complexity. OFDM has been chosen as the transmission method for the European radio (DAB) and TV (DVB-T) standard.

In OFDM, the subcarrier pulse that is used for transmission is rectangular. This has the advantage that the task of pulse forming and modulation can be performed by a simple Inverse Discrete Fourier Transform (IDFT), which can be implemented as an I Fast Fourier Transform (IFFT). Accordingly, in the receiver, an FFT can reverse this operation. According to the theorems of the Fourier Transform, the rectangular pulse shape will lead to a sin(x)/x type of spectrum of the subcarriers. The reason why the information transmitted over the carriers can still be separated is the so-called orthogonality relation giving the method its name. By using an IFFT for modulation, the spacing of the subcarriers is chosen in such a way that at the frequency where the received signal is evaluated, all other signals are zero. In order for the orthogonality to be preserved, the receiver and the transmitter must be perfectly synchronized. In other words, the receiver and the transmitter must both assume exactly the same modulation frequency and the same time-scale for transmission.

The OFDM symbols can be artificially prolonged by periodically repeating the tail of the symbol and precede the symbol with it. At the receiver this so-called guard interval is removed again. As long as the length of this interval is longer than the maximum channel delay all reflections of previous symbols are removed and the orthogonality is preserved. Accordingly, the OFDM transmission over a multipath channel can be achieved, since the transmitted symbols at a given time-slot and a given subcarrier are only disturbed by a factor which is the channel transfer function at the subcarrier frequency, and by additional white Gaussian noise.

However, despite of OFDM's provision of high data rates over extremely hostile channels, there still remains a strong need in the art to improve the existing modulation techniques, such as OFDM, to provide for an even more robust and efficient modulation techniques for transmission of data over noisy communication channels, such as powerlines, due to consumer product demands for broadband communications.

SUMMARY OF THE INVENTION

The present invention provides a modulation method and system, wherein data is mapped onto a set of concentric circles for transmission over a communication channel, such as home power lines. The phase data is coded differentially coherently, while the amplitude is coded coherently. The circles may contain equal number of points, and more points may be used on the outer circles. The data may be coded with dual Trellis codes, one code for the phase data and another code for the amplitude data. This modulation may be used with OFDM, FOFDM (Filtered OFDM), or WOFDM (Wavelet OFDM), in which case the differential phase coding may be across time from symbol to symbol. Some of the OFDM, WOFDM, or FOFDM symbols may be pilot symbols. This modulation method may be combined with QAM, DPSK, or other modulation types on different tones in the same OFDM symbol.

One or more embodiments of the present invention uses an efficient forward error-correction coding strategy to increase reliability over a competing scheme that uses uncoded modulations over the same bandwidth at the same transmission rate. The coded transmission of the present invention has simple, low-latency decoding with balanced error-protection across tones that comprise a specific application. A single decoding structure may operate on the received tones, adapting its operation with respect to signal to noise ratio.

BRIEF DESCRIPTION OF DRAWINGS

FIG. 12 illustrates a two-tone OFDM grid over four symbols.

FIG. 13 is an illustration of phase deltas for different modulation densities.

FIG. 18 is an illustration of 128DAPSK constellations.

FIG. 19 is an illustration of 256DAPSK constellations.

DETAILED DESCRIPTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

Furthermore, it should be appreciated that the particular implementations shown and described herein are merely exemplary and are not intended to limit the scope of the present invention in any way. For example, although the present invention is described in reference to communication over powerlines and OFDM, the present invention may be used over other communication channels and implemented in conjunction with other modulation techniques.

Overview of Powerline Technology

Powerline technology delivers a next generation home-networking capability that delivers high-rate, high-quality multiple simultaneous home entertainment streams and other digital content throughout the home using the powerline channel.

Figure 1:
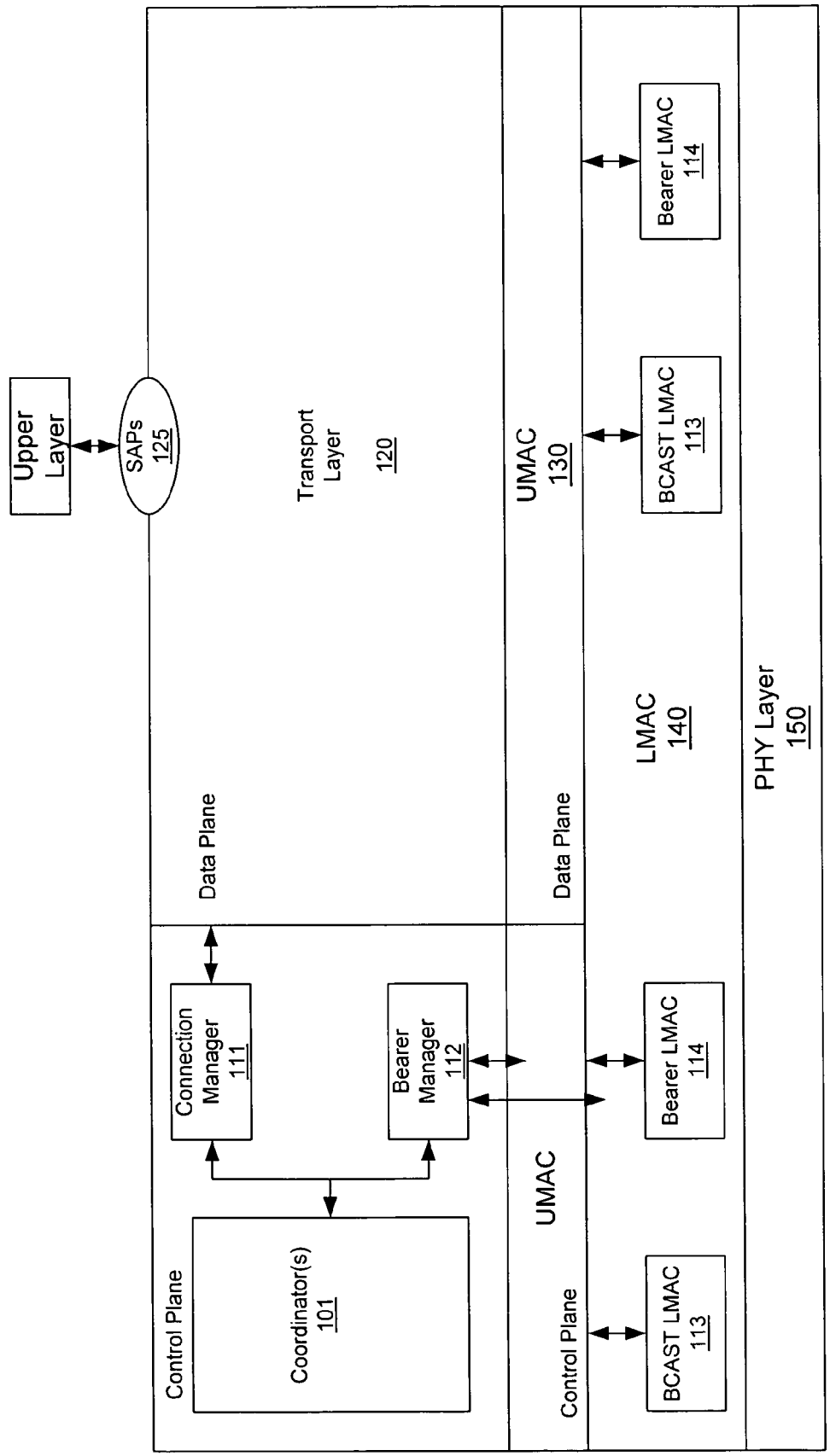
FIG. 1 is an illustration of the system layout of a powerline network device.

FIG. 1 is an illustration of the system layout of a powerline network device. As illustrated, a powerline network (PLN) device may be partitioned into four distinct layers based on functionality: the PHY 150, the Lower MAC (LMAC) 140, the Upper MAC (UMAC) 130 and the Transport Layer 120. In addition, there are three management entities called the Connection Manager (CM) 111, the Bearer Manager (BM) 112 and the Coordinators 101. Each Coordinator(s) 101 has functions based on the type of network. A PLN system supports a mix of audio, video, and IP applications. Use of Universal Plug and Play (UPnP) may also be employed for service discovery.

Transport Layer 120 roughly aligns with the standard ISO definition for Transport Layer in the OSI model. Transport Layer 120 provides convergence services between other protocols, which may be defined at lower layers of the OSI model, and the device's protocol stack. The Transport Layer can support various applications and protocols. The convergence functions of the Transport Layer include the definition of specific Service Access Points (SAPs) between the Application and the Transport Layer and functions such as Classification engines in the Transport Layer for each SAP 125. The Transport Layer also provides QoS support functions such as QoS specification of traffic flows (called Connections), QoS monitoring and control.

The Upper MAC (UMAC) layer 130 performs framing and multiplexing of application flows and control information flows, and maintains the mapping of Physical Channels to the corresponding flows.

The Lower MAC (LMAC) 140 performs Reed-Solomon Forward Error Correction (FEC) and Automatic Repeat reQuest (ARQ) and interleaves and scrambles the data on individual Physical Channels. The Lower MAC 140 includes communication channels Broadcast (BCAST) LMAC 113 and Bearer LMAC 114.

Communication on the Physical Layer (PHY) 150 is based on Orthogonal Frequency Division Multiplexing (OFDM). The PHY maps the data received from the LMAC into OFDM Symbols and modulates it onto the powerline wiring at frequencies (Tones) and time slots (Slots) allocated to the Physical Channel. (A tone is the smallest frequency unit that can carry modulated data. The frequency of Tone k is k times base frequency. In one embodiment, the base frequency is 39.0625 KHz and k ranges from 103 to 716) thus providing a communication range of 4-28 MHz.

The PHY 150 uses orthogonal frequency division multiplexing (OFDM) as the basic transmission technique. OFDM is well known in the arts. It is currently widely used in DSL technology and also in terrestrial wireless distribution of television signals. In contrast to these technologies, however, the powerline technology uses OFDM in a burst mode rather than in continuous mode. Powerline technology also uses concatenated Viterbi and Reed Solomon (RS) FEC with interleaving for payload data, and turbo product coding (TPC) for sensitive control data fields.

OFDM divides the high-speed data stream to be transmitted into multiple parallel bit streams, each of which has a relatively low bit rate. Each bit stream then modulates one of a series of closely spaced carriers. The property of orthogonality is a result of choosing the carrier spacing equal to the inverse of the bit rate on each carrier. The practical consequence of orthogonality is that if a Fast Fourier transform (FFT) of the received waveform is performed over a time span equal to the bit rate on an individual carrier, the value of each point in the FFT output is a function only of the bit (or bits) that modulated the corresponding carrier, and is not impacted by the data modulating any other carrier.

When the carrier spacing is low enough that the channel response is relatively constant across the band occupied by the carrier, channel equalization becomes easy. Implemented in the frequency domain, equalization can be achieved by a simple weighting of the symbol recovered from each carrier by a complex valued constant. Many different types of modulation can be used on the individual carriers.

The need for equalization however is completely eliminated by using differential phase shift keying (DPSK) modulation. DPSK modulation is where the data is encoded as the difference in phase between the present and previous symbol in time on the same subcarrier. Differential modulation improves performance in environments where rapid changes in phase are possible.

The PHY uses adaptive modulation methods for each Tone to provide a modulation density from 1 to 10 bits per Simple Symbol. This allows the PHY to dynamically adapt to Channel conditions on a Tone-by-Tone basis thus optimizing throughput.

An embodiment of the present invention defines a Frame that is comprised of Slots and Tones. Each Slot consists of a fixed number of OFDM Symbols. Communication between PLNs occurs in a channel that comprises one or more Slot-Tone Sets (a.k.a. Bursts). The precise mapping of Slot-Tone Sets defining a channel is controlled by the coordinator(s) 101. These mappings may be made known to the PLNs involved either by an allocation when negotiating the communication parameters for the physical channel or at the beginning of each frame by the coordinator of the network.

If coherent modulation is used, each Slot-Tone Set includes Pilot Tones, which use a fixed BPSK Modulation pattern that is known to all receivers. In one embodiment, Pilot Tones are assigned on an average of about every 16th Tone to assist in receiver demodulation and decoding.

At the beginning of each Frame the coordinator broadcasts a Beacon Message that assigns Physical Channels for the Frame. All Slots not assigned to the physical channels may be reserved. Possible uses determined by the coordinator for these reserved Slots include: Bearers (on which the appropriate PLNs will transmit), silence (for sounding measurements), Sub-Frames for the use of Neighboring powerline networks, or for coexistence with prior art powerline networks.

EXAMPLE EMBODIMENTS

Embodiments of the present invention provide an efficient coding/modulation scheme for reliable powerline communication of data streams between network components. The OFDM medium of the present invention may include a collection of parallel (available for simultaneous use), non-interfering (ICI-free), independent, flat, stationary, additive white Gaussian noise (AWGN) channels with different signal-to-noise ratios (SNR) that are available at the transmitting node prior to the transmission.

Embodiments of the present invention use an efficient forward error-correction (FEC) coding strategy to increase reliability over prior art communication schemes that use other modulation schemes (herein uncoded modulation) over the same bandwidth at the same transmission rate. The channel coding schemes of the present invention deliver higher data rates at the same reliability as the best uncoded scheme of the prior art over the same bandwidth. The coding-gain is consistent and robust over a range of possible channel conditions and transmission impairments.

The coded transmission of the present invention allows for simple, low-latency decoding with balanced error-protection across tones that comprise a specific application. A simple decoding structure operates on the received tones, adapting its operation with respect to SNR.

In one or more embodiments, the coding strategy uses rate-adaptive Trellis-coded modulation across tones. Trellis-coded modulation (TCM), which is well known in the arts, has characteristically low-latency, is simple to decode and is amenable for rate adaptation.

The modulation method and system of the present invention involves mapping data onto a set of concentric circles in a two-dimensional plane. The phase data is coded differentially (i.e. the information is most commonly in the difference between the carrier phase of the symbol at the current symbol time at a given frequency and the carrier phase of the symbol at the previous symbol time at the same given frequency), while the amplitude is coded coherently (i.e., the information is in the amplitude of the signal). In some embodiments, the circles in each constellation may contain equal number of points, and in other embodiments more points may be used on the outer circles. The data may be coded with dual Trellis codes, one code for the phase data and another code for the amplitude data.

Embodiments of the invention may employ OFDM, FOFDM (i.e. Filtered OFDM), or WOFDM (i.e. Wavelet OFDM), in which case the differential phase coding may be across time from symbol to symbol. Some of the OFDM, WOFDM, or FOFDM symbols may be pilot symbols. Modulation method of the present invention may be combined with QAM, DPSK, or other modulation types on different tones in the same OFDM symbol.

Figure 2:
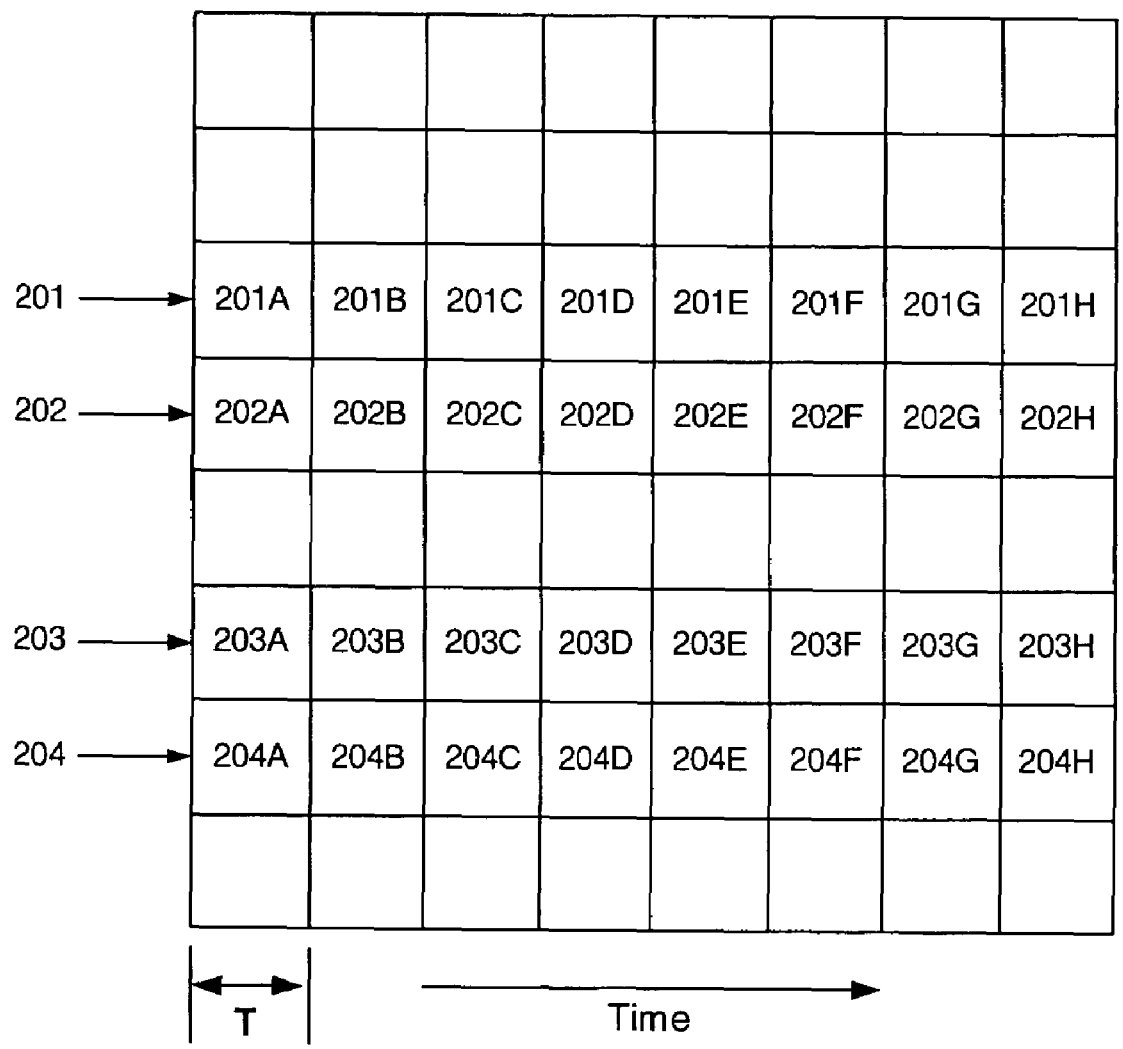
FIG. 2 illustrates the time-frequency grid of a generic orthogonal frequency-division multiplexing system.

FIG. 2 illustrates the time-frequency grid of a generic orthogonal frequency-division multiplexing (OFDM) system. In this illustration, four different tones or subcarriers are shown, 201-204. (A tone is the smallest frequency unit that can carry modulated data. The frequency of Tone k is k times base frequency. In one embodiment, the base frequency is 39.0625 KHz and k ranges from 103 to 716). The different tones are capable of supporting different transmission rates. The parameter T is the OFDM symbol duration. Thus, each of grids 201A-201H, 202A-202H, 203A-203H, and 204A-204H represent an OFDM symbol of duration T. The postscripts A-H in each grid of each subcarrier, 201-204, represent possible variations in subchannel gain. For instance, the subchannel gain in grid 201A is possibly different from the subchannel gain in grid 201B, 201C, etc.

An OFDM symbol of duration T may be regarded as a vector of Q available tones or subcarriers, received with no intercarrier interference (ICI) and no intersymbol interference (ISI) under ideal channel conditions. An example embodiment of the present invention uses a value for T of 32 microseconds, and a value for Q of 574 tones. A subset of the available tones provides the bandwidth for data transmission in a specific application. Some tones may be reserved for channel gain estimation.

For uncoded transmission, the placement of modulation symbols over the available tones has no bearing on the performance—as long as rate assignment over the tones is the same—since there is no memory in the modulation. However, coding introduces memory and the placement of modulation symbols from a codeword sequence plays an important role in decoding delay- and error performance if the channel is time-varying as in home power line environments.

Figure 3:
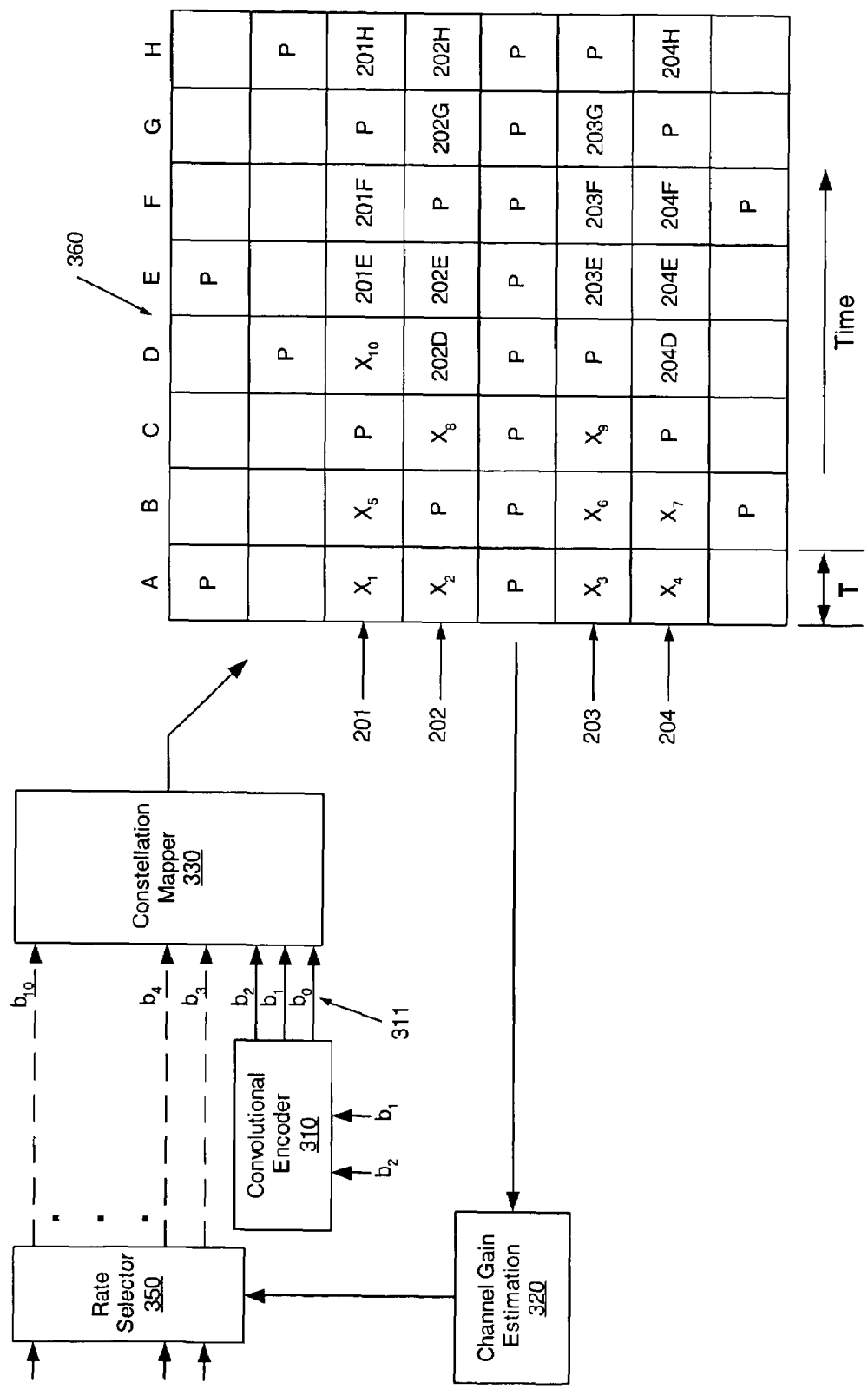
FIG. 3 illustrates a trellis-coded OFDM transmission of the phase component.

Some embodiments of the present invention use a fixed core TCM, which has a rate-2/3 systematic feedback convolutional encoder driving an 8PSK constellation with natural labeling. FIG. 3 illustrates a trellis-coded OFDM transmission of the phase component. In this illustration, two information bits $b_1$ and $b_2$ cause a state transition and the convolutional encoder outputs a nonsystematic coded bit $b_0$, 311. The three bit label $b_2 b_1 b_0$ describes the phase angle $2\pi(4b_2+2b_1+b_0)/8$.

Channel gain is provided to the encoder via channel gain estimation block 320. In one embodiment, the receiver estimates the SNR (signal-to-noise) ratio of the channel and notifies the transmitter with feedback data. The transmitter determines the appropriate transmission scheme from the feedback data. Based on the determined channel gain, an appropriate transmission rate is selected in Rate Selector block 350. The rate selection criteria may include signal to noise ratio considerations. Based on the selected rate, Block 330 maps the data onto the appropriate constellation for transmission.

Block 360 represents the transmission grid. As illustrated in block 360, codeword symbols, $X_1$-$X_{10}$, are placed across available tones for transmission. Symbol P denotes pilot symbols.

The core TCM delivers a minimum-rate transmission of 2-bits/symbol. For higher rates, uncoded bits are used to expand the basic constellation through set partitioning. In addition, the system is flexible enough that a minimum-rate of 1-bit/symbol may be achieved without changing the structure thus providing better overall spectral efficiency. A 1-bit/symbol rate system could be achieved through disabling the bit $b_2$ by setting it to zero, and by mapping $b_1 b_0$ on a QPSK constellation with natural labeling.

Selection of Modulation Scheme

The exact structure of a suitable TCM is shaped by many factors, including the nature of the variation of the channel transfer function, the accuracy and complexity of channel estimation, and the need to minimize decoding delay.

In one or more embodiments of the present invention, the phase components of the coded streams are signaled differentially to avoid the need for locked carrier acquisition circuits, thereby simplifying the receiver design. The basic idea behind differential phase signaling is the cumulative encoding of the information-bearing phase.

Trellis-coding for differential phase modulations usually takes the form of a standard PSK-TCM concatenated with a cumulative phase encoder. Since memory is introduced in the phase modulation, codeword maximum-likelihood metrics are not additive over trellis branches, standard Viterbi decoding is suboptimal.

There are two main approaches to decoding a trellis-coded DPSK sequence: Trellis-based decoding and tree-based decoding. Trellis-based decoding relies on the Viterbi algorithm to prune the set of hypothesized paths, either with an additive-suboptimal path metric or with a non-additive suboptimal metric. Tree-based algorithms use the optimum metric for an exhaustive or sparse search of the tree of hypothesized paths. The complex nature of the stack operations (such as sorting and backtracking) makes the tree-based algorithms better candidates for values of N higher than the constraint length of the TCM. For such values of N (e.g., N=10, 20), the simplicity of Viterbi pruning is outweighed by the number of survivor paths retained per state. Trellis-based schemes are more suited to small values of N, typically up to 5.

A second set of considerations on the design of a suitable TCM arises from the fact that the channel transfer function is not stationary in practice. Consequently, channel gain estimation is not error-free. Thus, the phase of the channel is of most importance to TCM-based modem designs.

Standard coherent trellis coded modulations are known to be more sensitive to phase errors as compared to their uncoded counterparts of the same rate as a result of the constellation expansion leading to a smaller angular separation. Experimental measurements indicate that the transfer function of power-line subchannels is subject to periodic state change, resulting from a superposition of multiple periodic behaviors, e.g., with period 120 Hz, or 260 symbols. Although channel gain amplitude changes can be tracked easily and accurately, such is not the case with the phase, especially on a symbol-by-symbol basis. In most cases, a channel phase change accompanies a channel amplitude change.

A simple model for the periodic behavior in the phase of a channel is a phase change, for a single symbol, which may degrade performance when overlooked at the receiver. The most severe phase change for a set-partitioned PSK TCM is a phase reversal since cosets of such a code have 180 degrees phase symmetry.

In addition to the periodic change of transfer function behavior, the phase of the channel has small fluctuations (typically 5-10 degrees) on a per symbol basis. It is well known in the art that trellis-coded phase modulations may be susceptible to sustained carrier-phase offsets. Similarly, performance degradation may be experienced with periodic phase errors with a period large compared to the constraint length of the code. However, the knowledge of the location of intermittent phase errors may help restore coded performance when erasures decoding is employed.

Erasure Decoding and Interleaving

When the decoder is provided with information that a set of received symbols is unreliable, it may choose to declare an erasure, that is, simply ignore those received values when detecting a codeword. However, to maintain coded performance when using erasures-decoding, the erasure rate of the encoder need to stay less than 1/1. For instance, a 2-bits/symbol 8PSK TCM may not be capable of delivering coded performance under erasures more often than (and including) one erasure every three symbols. In other words, if one out of three symbols is erased, then the decoder has 3+3+0=6 bits to rely on for 2+2+2=6 bits, which is similar to an uncoded transmission.

Also note that coded performance may not be maintained if the set of erased symbols wipe out a constraint length of the code. This is because if as many symbols as the constraint length of the code are erased, those symbols cannot be recovered with higher than coin-toss reliability. The symbol error rate performance will be above K/2T where K is the constraint length of the code and T is the period of the K-erasures. Such a symbol error-rate is readily available by uncoded modulations under the same erasures pattern.

A phase reversal produces two consecutive phase-delta reversals when differential detection is used. Interleaving may help separate the two consecutive errors. However, periodic phase-delta reversals may still exist. If the phase reversals can be localized, erasure decoding may be used to restore performance so long as erasure duration is less than the constraint length of the code.

Figure 4:
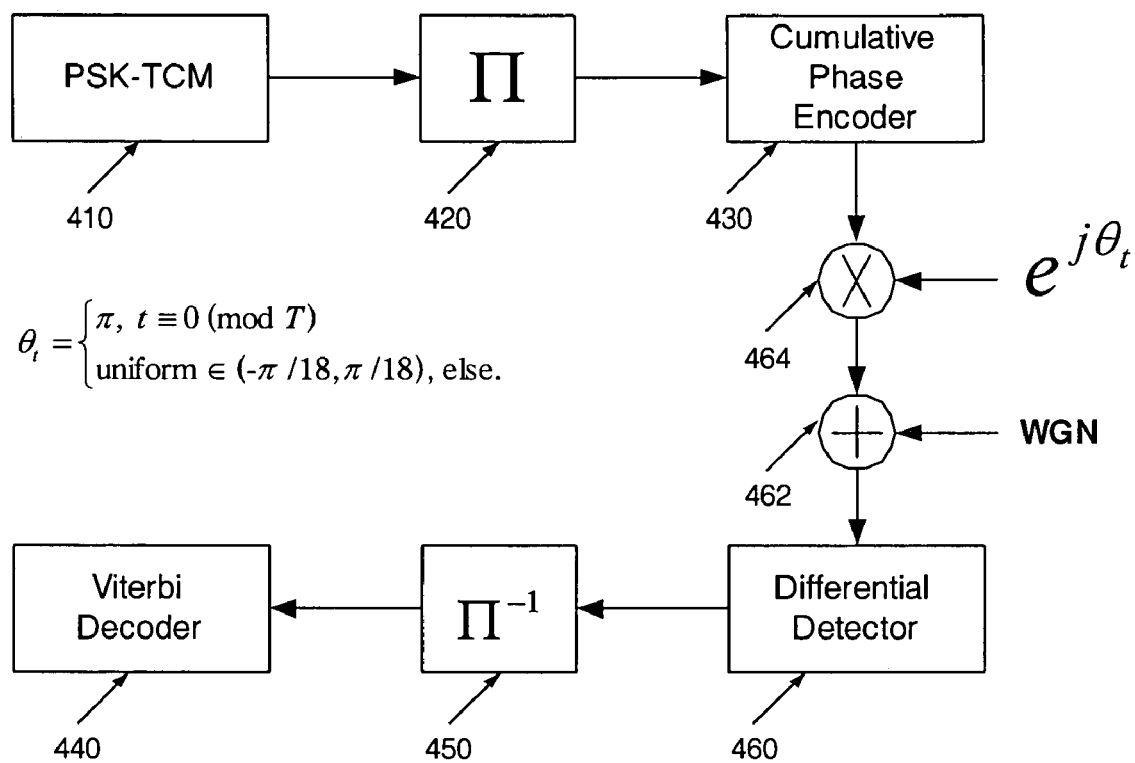
FIG. 4 is an illustration of a simulation model for a symbol-interleaving scheme to break up consecutive phase-delta errors.

FIG. 4 is an illustration of a simulation model for a symbol-interleaving scheme to break up consecutive phase-delta errors. As illustrated, the codeword output of a standard PSK-TCM 410 is interleaved in block 420 and then encoded onto the channel at 464 using Cumulative Phase Encoder 430. The angle $\theta_t$ is the channel phase. White Gaussian Noise is added in block 462.

At the receiver level, a differential detector 460 is used to receive the signal, which is subsequently de-interleaved in block 450. Finally, the received data is decoded using Viterbi Decoder 440.

Figure 5:
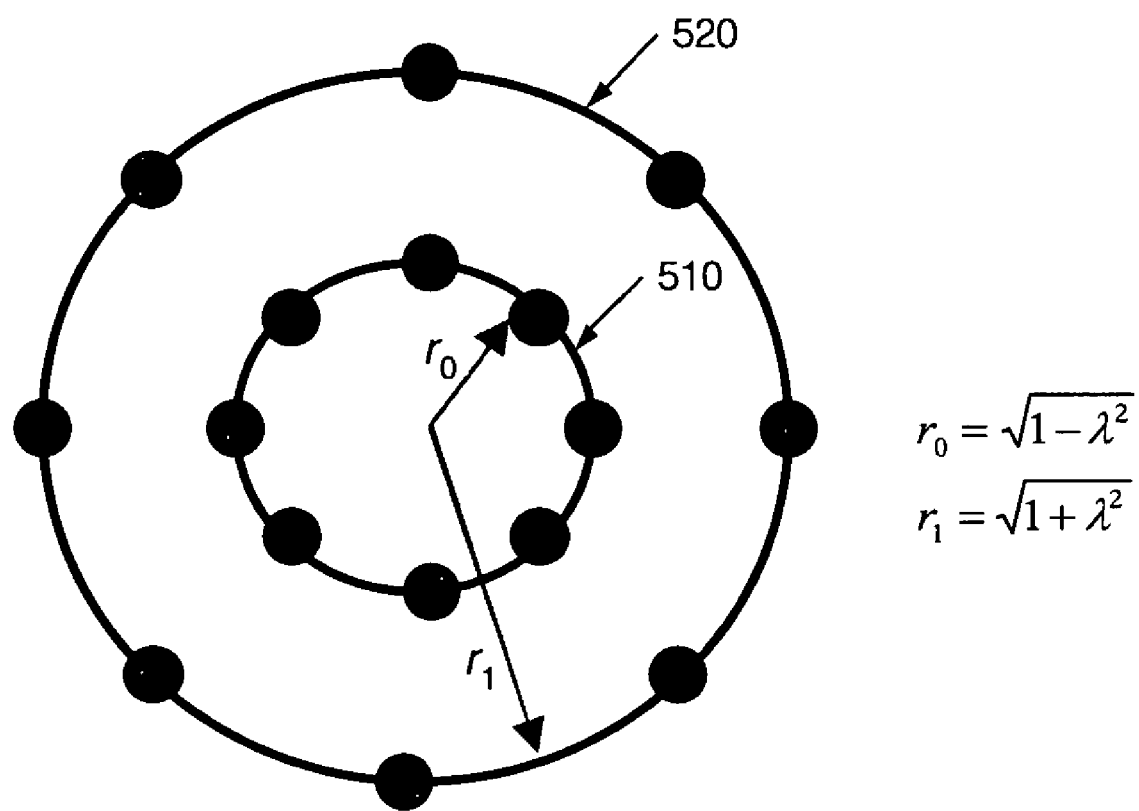
FIG. 5 is an illustration of a Unit-energy 16-point constellation using two 8DPSK rings.

Although interleaved erasures decoding solution for the trellis-coded differential phase modulations is well-behaved when the erasure localization is accurate to within two symbols, it is often impractical to code higher rate systems (>2 bits/symbol) only onto the phase dimension. Thus, for rates higher than 2-bits/symbol, embodiments of the present invention use the amplitude dimension of the MDPSK constellations for information transmission. The simplest 3-bits/symbol solution that builds on the 2-bits/symbol phase-coded system uses an uncoded ring identifier bit. A Unit-energy 16-point constellation using two 8DPSK rings is illustrated in FIG. 5. A rate-2/3 8DPSK TCM selects angle $b_2 b_1 b_0$ (each dot represents an angle) and the uncoded bit $b_3$ selects ring. Note that the phase delta of an MDPSK constellation is given by $2\pi/M$. FIG. 13 is an illustration of phase deltas for different modulation densities, where D[0] represents bit 0 (i.e. least significant bit), D[1] represents bit 1, etc.

Referring back to FIG. 5, the parameter $\lambda \in (0,1)$ controls the tradeoff between error protection for the coded bits (b2b1) and that for the uncoded (b3) bit. Larger values of $\lambda$ provide more protection for the uncoded bit and less protection for the coded bits. For a Bit Error Rate (BER) range of 1e-4 to 1e-3, $\lambda=0.83$ was found to be approximately optimum in delivering the smallest average BER.

The set-partitioning of the two-ring composite constellation depends on the relative magnitudes of the distance between the two rings, 510 and 520, and the distance between inner PSK points. However, for various reasons joint coding of the amplitude and phase dimensions produce results that are not amenable to differential phase coding. Thus, one or more embodiments of the present invention use separate coding for both the amplitude and phase dimensions.

Amplitude Coding

Existing phase codes provide integer rate transmission with two coded bits, and more with standard set-partitioning around the circle. The amplitude lives on the positive real axis, therefore it may be encoded via standard Pulse Amplitude Modulation (PAM) codes that have one bit per symbol constellation expansion. This leads to, for example, using eight different rings for 2-bits/T on the amplitude. With such an expansion, the amplitude dimension may get very crowded very soon. Since the amplitude code, being decoupled from any contingent phase errors, is more robust, a half-a-bit-per-symbol expansion via one bit expansion over two symbols would be adequate.

Amplitude-Coding Over Two Consecutive Trellis Symbols

The concept of multiple-symbol coding is best explained through an example. With 1-bit/T of expansion (redundancy), 1-bit/T can be transmitted using 2 bits, i.e., four different amplitudes. However, embodiments of the present invention encode 2 bits over two symbols (which is the same rate) using 1-bit/2T expansion, i.e. eight different pairs of amplitude levels over two symbol intervals. The term symbol or T as used in the preceding sections is used in a general sense, without any reference to the OFDM grid. The term two consecutive trellis symbols refers to two outputs from consecutive trellis stages. These symbols may be placed anywhere in the OFDM grid, they may be in the same OFDM symbol in neighboring tones, or may be in neighboring OFDM symbols, truly consecutive in time.

Figure 6:
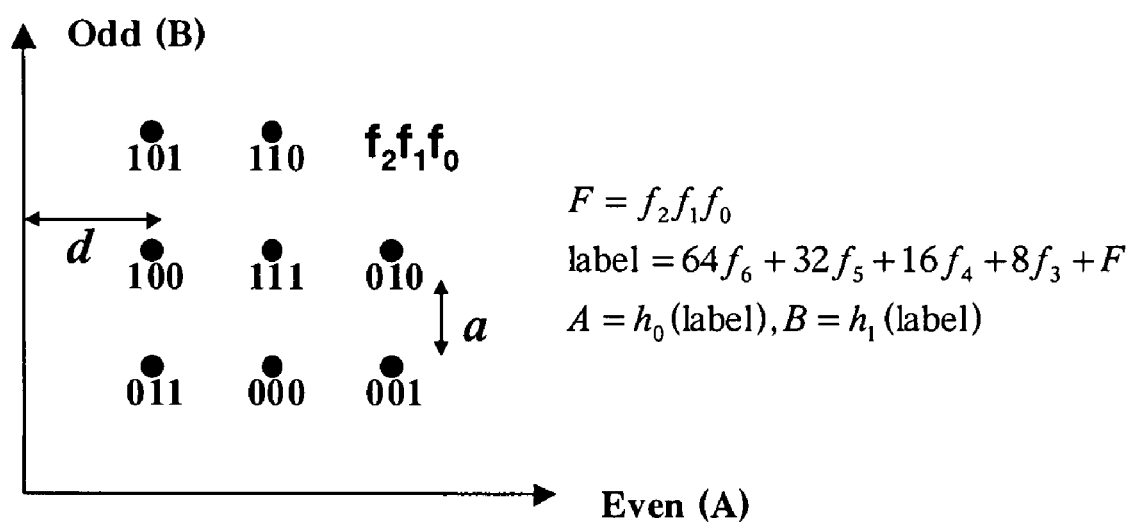
FIG. 6 is an illustration of a 2 bits/2T amplitude transmission using an 8-point constellation over two symbols.

In one embodiment of the present invention, amplitude coding is through a rate 2/3-systematic feedback encoder mapping an 8-point constellation for pairs of amplitudes over two-symbol intervals. FIG. 6 is an illustration of a 2 bits/2T amplitude transmission using an 8-point constellation over two symbols. This illustration shows the constellation for amplitude pairs over two consecutive symbol intervals. The A-trellis (amplitude) encoder takes two information bits, $f_2 f_1$, makes a state-transition and outputs three bits, $f_2 f_1 f_0$, say "110". Uncoded bits are added through constellation expansion. Based on the mapping given in FIG. 6, the radius of the current PSK symbol is scaled by d+a, and that of the next PSK symbol is scaled by d+2a. The a and d symbols may be optimized under a unit symbol energy (ES) constraint for the target BER region. The discussion below presents various values of a and d for different transmission rates.

A state transition of the amplitude TCM outputs a pair of ring amplitude labels, for the current two symbols. The two parameters a and d exactly describe each of the constellations. The parameter a is the minimum amplitude spacing, the parameter d is the minimum amplitude. In the following tables, these parameters are adjusted so that the modulations have unit energy per symbol (average squared amplitude over a symbol is unity).

For the 2-bits/symbol phase TCM, $f_0$ is the non-systematic coded bit, $f_1$, $f_2$ are the two systematic coded bits, and $f_3$, $f_4$, $f_5$ are uncoded bits.

| Table for 2x3PAM 8-Point Amplitude Constellation | |
|---|---|
| f2 f1 f0 | (r_even, r_odd) |
| 000 | (d + a, d) |
| 001 | (d + 2a, d) |
| 010 | (d + 2a, d + a) |
| 011 | (d, d) |
| 100 | (d, d + a) |
| 101 | (d + a, d + a) |
| 110 | (d + a, d + 2a) |
| 111 | (d, d + 2a) |

A table that lists the labeling of a 512-point constellation for the A-dimension is omitted for practical reasons. However, the 512-point constellation may be formed by the union of four 128-point cosets, much like a 128-point constellation may be formed by the union of four 32-point cosets. A coset of the 512-point constellation is the 128 point-constellation expanded by a factor of four (to accommodate 2 more bits). An expansion by a factor of four means that in the entire 512-point constellation, starting from any point in a coset and going either vertically or horizontally, one would travel three points, one from each of the other three cosets, before reaching the nearest point in the original starting coset.

Table for 2x6PAM 32-Point Amplitude Constellation

| f4 f3 f2 f1 f0 | (r_even, r_odd) |
|---|---|
| 00000 | (d + 2a, d) |
| 00001 | (d + 3a, d) |
| 00010 | (d + 3a, d + a) |
| 00011 | (d + 2a, d + a) |
| 00100 | (d + 4a, d) |
| 00101 | (d + 5a, d + 4a) |
| 00110 | (d + 5a, d + a) |
| 00111 | (d + 4a, d + 5a) |
| 01000 | (d + 4a, d + 2a) |
| 01001 | (d + 5a d + 2a) |
| 01010 | (d + 5a, d + 3a) |
| 01011 | (d + 4a, d + 3a) |
| 01100 | (d + 4a, d + 4a) |
| 01101 | (d + a, d + 4a) |
| 01110 | (d + a, d + a) |
| 01111 | (d + 4a, d + a) |
| 10000 | (d, d + 2a) |
| 10001 | (d + a, d + 2a) |
| 10010 | (d + a, d + 3a) |
| 10011 | (d, d + 3a) |
| 10100 | (d, d + 4a) |
| 10101 | (d + a, d) |
| 10110 | (d + a, d + 5a) |
| 10111 | (d, d + a) |
| 11000 | (d + 2a, d + 4a) |
| 11001 | (d + 3a, d + 4a) |
| 11010 | (d + 3a, d + 5a) |
| 11011 | (d + 2a, d + 5a) |
| 11100 | (d + 2a, d + 2a) |
| 11101 | (d + 3a, d + 2a) |
| 11110 | (d + 3a, d + 3a) |
| 11111 | (d + 2a, d + 3a) |

Table for 2x12PAM 128-Point Amplitude Constellation

| f6 f5 f4 f3 f2 f1 f0 | (r_even, r_odd) | f6 f5 f4 f3 f2 f1 f0 | (r_even, r_odd) |
|---|---|---|---|
| 0000000 | (d + 2a, d) | 0000001 | (d + 2.5a, d) |
| 0000100 | (d + 3a, d) | 0000101 | (d + 3.5a, d) |
| 0001000 | (d + 3a, d + a) | 0001001 | (d + 3.5a, d + a) |
| 0001100 | (d + 2a, d + a) | 0001101 | (d + 2.5a, d + a) |
| 0010000 | (d + 4a, d) | 0010001 | (d + 4.5a, d) |
| 0010100 | (d + 5a, d + 4a) | 0010101 | (d + 5.5a, d + 4a) |
| 0011000 | (d + 5a, d + a) | 0011001 | (d + 5.5a, d + a) |
| 0011100 | (d + 4a, d + 5a) | 0011101 | (d + 4.5a, d + 5a) |
| 0100000 | (d + 4a, d + 2a) | 0100001 | (d + 4.5a, d + 2a) |
| 0100100 | (d + 5a, d + 2a) | 0100101 | (d + 5.5a, d + 2a) |
| 0101000 | (d + 5a, d + 3a) | 0101001 | (d + 5.5a, d + 3a) |
| 0101100 | (d + 4a, d + 3a) | 0101101 | (d + 4.5a, d + 3a) |
| 0110000 | (d + 4a, d + 4a) | 0110001 | (d + 4.5a, d + 4a) |
| 0110100 | (d + a, d + 4a) | 0110101 | (d + 1.5a, d + 4a) |
| 0111000 | (d + a, d + a) | 0111001 | (d + 1.5a, d + a) |
| 0111100 | (d + 4a, d + a) | 0111101 | (d + 4.5a, d + a) |
| 1000000 | (d, d + 2a) | 1000001 | (d + 0.5a, d + 2a) |
| 1000100 | (d + a, d + 2a) | 1000101 | (d + 1.5a, d + 2a) |
| 1001000 | (d + a, d + 3a) | 1001001 | (d + 1.5a, d + 3a) |
| 1001100 | (d, d + 3a) | 1001101 | (d + 0.5a, d + 3a) |
| 1010000 | (d, d + 4a) | 1010001 | (d + 0.5a, d + 4a) |
| 1010100 | (d + a, d) | 1010101 | (d + 1.5a, d) |
| 1011000 | (d + a, d + 5a) | 1011001 | (d + 1.5a, d + 5a) |
| 1011100 | (d, d + a) | 1011101 | (d + 0.5a, d + a) |
| 1100000 | (d + 2a, d + 4a) | 1100001 | (d + 2.5a, d + 4a) |
| 1100100 | (d + 3a, d + 4a) | 1100101 | (d + 3.5a, d + 4a) |
| 1101000 | (d + 3a, d + 5a) | 1101001 | (d + 3.5a, d + 5a) |
| 1101100 | (d + 2a, d + 5a) | 1101101 | (d + 2.5a, d + 5a) |
| 1110000 | (d + 2a, d + 2a) | 1110001 | (d + 2.5a, d + 2a) |
| 1110100 | (d + 3a, d + 2a) | 1110101 | (d + 3.5a, d + 2a) |
| 1111000 | (d + 3a, d + 3a) | 1111001 | (d + 3.5a, d + 3a) |
| 1111100 | (d + 2a, d + 3a) | 1111101 | (d + 2.5a, d + 3a) |
| 0000010 | (d + 2a, d + 0.5a) | 0000011 | (d + 2.5a, d + 0.5a) |
| 0000110 | (d + 3a, d + 0.5a) | 0000111 | (d + 3.5a, d + 0.5a) |
| 0001010 | (d + 3a, d + 1.5a) | 0001011 | (d + 3.5a, d + 1.5a) |
| 0001110 | (d + 2a, d + 1.5a) | 0001111 | (d + 2.5a, d + 1.5a) |
| 0010010 | (d + 4a, d + 0.5a) | 0010011 | (d + 4.5a, d + 0.5a) |
| 0010110 | (d + 5a, d + 4.5a) | 0010111 | (d + 5.5a, d + 4.5a) |
| 0011010 | (d + 5a, d + 1.5a) | 0011011 | (d + 5.5a, d + 1.5a) |
| 0011110 | (d + 4a, d + 5.5a) | 0011111 | (d + 4.5a, d + 5.5a) |
| 0100010 | (d + 4a, d + 2.5a) | 0100011 | (d + 4.5a, d + 2.5a) |
| 0100110 | (d + 5a, d + 2.5a) | 0100111 | (d + 5.5a, d + 2.5a) |
| 0101010 | (d + 5a, d + 3.5a) | 0101011 | (d + 5.5a, d + 3.5a) |
| 0101110 | (d + 4a, d + 3.5a) | 0101111 | (d + 4.5a, d + 3.5a) |
| 0110010 | (d + 4a, d + 4.5a) | 0110011 | (d + 4.5a, d + 4.5a) |
| 0110110 | (d + a, d + 4.5a) | 0110111 | (d + 1.5a, d + 4.5a) |
| 0111010 | (d + a, d + 1.5a) | 0111011 | (d + 1.5a, d + 1.5a) |
| 0111110 | (d + 4a, d + 1.5a) | 0111111 | (d + 4.5a, d + 1.5a) |
| 1000010 | (d, d + 2.5a) | 1000011 | (d + 0.5a, d + 2.5a) |
| 1000110 | (d + a, d + 2.5a) | 1000111 | (d + 1.5a, d + 2.5a) |
| 1001010 | (d + a, d + 3.5a) | 1001011 | (d + 1.5a, d + 3.5a) |

-continued

Table for 2x12PAM 128-Point Amplitude Constellation

| f6 f5 f4 f3 f2 f1 f0 | (r_even, r_odd) | f6 f5 f4 f3 f2 f1 f0 | (r_even, r_odd) |
|---|---|---|---|
| 1001110 | (d, d + 3.5a) | 1001111 | (d + 1.5a, d + 3.5a) |
| 1010010 | (d, d + 4.5a) | 1010011 | (d + 0.5a, d + 4.5a) |
| 1010110 | (d + a, d + 0.5a) | 1010111 | (d + 1.5a, d + 0.5a) |
| 1011010 | (d + a, d + 5.5a) | 1011011 | (d + 1.5a, d + 5.5a) |
| 1011110 | (d, d + 1.5a) | 1011111 | (d + 0.5a, d + 1.5a) |
| 1100010 | (d + 2a, d + 4.5a) | 1100011 | (d + 2.5a, d + 4.5a) |
| 1100110 | (d + 3a, d + 4.5a) | 1100111 | (d + 3.5a, d + 4.5a) |
| 1101010 | (d + 3a, d + 5.5a) | 1101011 | (d + 3.5a, d + 5.5a) |
| 1101110 | (d + 2a, d + 5.5a) | 1101111 | (d + 2.5a, d + 5.5a) |
| 1110010 | (d + 2a, d + 2.5a) | 1110011 | (d + 2.5a, d + 2.5a) |
| 1110110 | (d + 3a, d + 2.5a) | 1110111 | (d + 3.5a, d + 2.5a) |
| 1111010 | (d + 3a, d + 3.5a) | 1111011 | (d + 3.5a, d + 3.5a) |
| 1111110 | (d + 2a, d + 3.5a) | 1111111 | (d + 2.5a, d + 3.5a) |

Constellations for 2-bits/2T, 4-bits/2T, 6-bits/2T, 8-bits/2T Transmission on Ring Amplitudes Embodiments with 2 bits/2T transmission on the A-dimension may be accomplished via a 2-symbol trellis coding on the 8-point constellation given in FIG. 6. For unit symbol energy ($E_s$) in the transmission, the parameters a and d for this 8-point constellation follow the relationship expressed in the following equation:

$$8d^2 + 14ad + 11a^2 - 8 = 0$$

For R=3-bits/T overall transmission rate and a target average BER of 5e-4, the parameters (a,d)=(0.445, 0.548) were found to be approximately optimal. For R=4 bits/T, the A dimension still transmits 2 bits/2T. For this rate, the choice of (a,d)=(0.282, 0.729) is approximately optimal at a target average BER of 5e-4.

Figure 7:
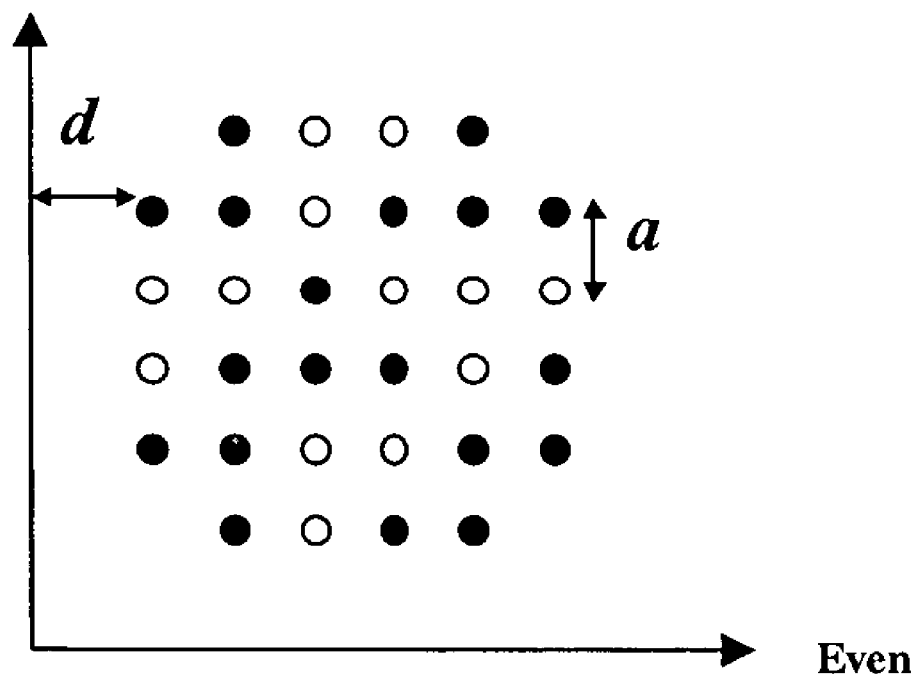
FIG. 7 is an illustration of a 2-symbol trellis coding on the 32-point constellation for a 4 bits/2T transmission on the Amplitude dimension.

Embodiments with 4 bits/2T transmission on the A-dimension is carried out by 2-symbol trellis coding on the 32-point constellation shown in FIG. 7. For unit symbol energy ($E_s$) in the transmission, the parameters a and d for this 32-point constellation follow the relationship expressed in the following equation:

$$d^2 + 5ad + 8.75a^2 - 1 = 0$$

For R=5 bits/T overall transmission rate, the A-dimension has 4 bits/2T and the P-dimension has 3 bits/T. For target average BER of 5e-4, the parameters (a,d)=(0.242,0.375) are approximately optimal. For R=6 bits/T, the A dimension still transmits 4 bits/2T. For this rate, the parameters (a,d)=(0.174,0.626) is approximately optimal at target average BER of 5e-4.

Figure 8:
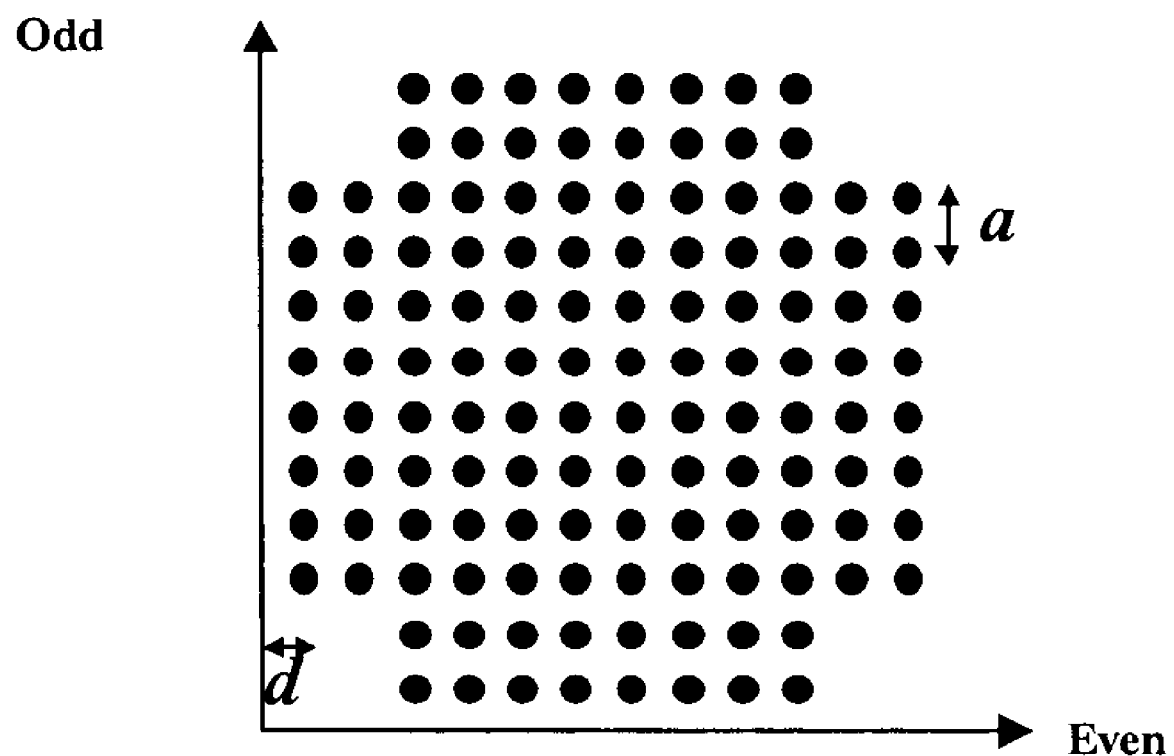
FIG. 8 is an illustration of a 2-symbol trellis coding on the 128-point constellation for a 6 bits/T transmission on the Amplitude dimension.
Figure 9:
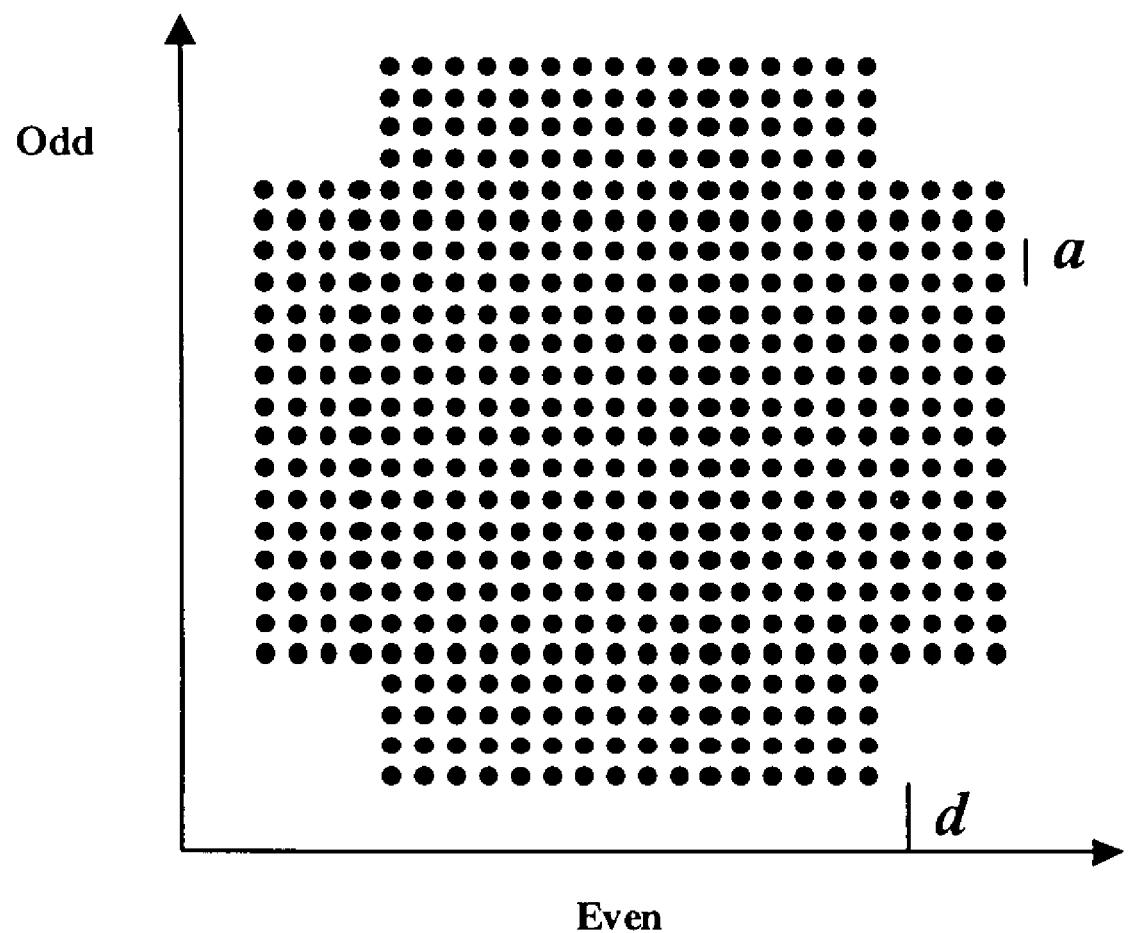
FIG. 9 is an illustration of a 2-symbol trellis coding on the 512-point constellation for a 7 bits/T transmission on the Amplitude dimension.

R=7 bits/T and R=8 bits/T schemes use 6 bits/2T transmission on A-dimension using the 128-point constellation shown in FIG. 8 over two consecutive symbol intervals. For R=7 bits/T, the parameters (a,d)=(0.117,0.306) have been found to be approximately optimal. For R=8 bits/T, (a,d)=(0.088,0.491) may be implemented. FIG. 9 is an illustration of a 2-symbol trellis coding on the 512-point constellation for a 7 bits/T transmission on the Amplitude dimension.

It should be apparent to those of skill in the arts that parameter values for (a,d) presented herein are examplary for the rates discussed and not exhaustive. Similar values for parameters a, and d may be generated for other desired transmission rates.

The 16-state A-Encoder

Figure 10:
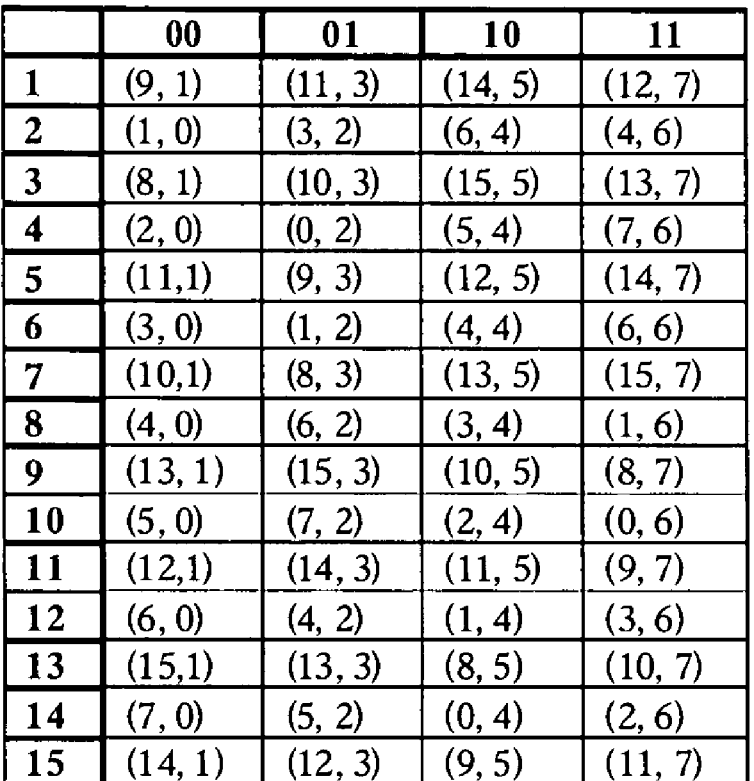
FIG. 10 is a tabular illustration of a 16-state basic A-trellis encoder for transmission at 2 bits/2T.

FIG. 10 is a tabular illustration of a 16-state basic A-trellis encoder for transmission at 2 bits/2T. Row 1004 represents the input data bit sequence ($f_2 f_1$) while column 1002 represents the states. Each row displays the set of four outgoing transitions, each in the form of (new_state, output_label) corresponding to inputs read from the column bits ($f_2 f_1$). Note that the encoder is systematic therefore the output label for input ($f_2 f_1$) is ($f_2 f_1 f_0$) where $f_0$ is the nonsystematic coded bit. For example, with an input of binary (10) and an initial state of 12, the code transits from state 12 to state 1 and outputs the constellation label 4, which is 100 in binary, thus the two consecutive ring radii of FIG. 5 are (d,d+a) as provided in the "2×3PAM 8-Point Amplitude Constellation" table previously presented.

For higher rates, uncoded bits are added as most significant positions of the binary representation in the label. For example, suppose the encoder is currently at state 7. For R=7 bits/T, the A-dimension will transmit 6 bits/2T (see "Amplitude and Phase Constellation Rate Table" below). If the input is $f_5 f_4 f_3 f_2 f_1 = 10111$, then the code transits to state 15 with output $f_2 f_1 f_0 = 111$ (7) and the full constellation label is $f_5 f_4 f_3 f_2 f_1 = 101111$ (47).

Signaling The Phase Dimension

The P-dimension may be coded through a core 2 bits/T 8PSK TCM that is differentially signaled. The P-trellis encoder takes two information bits, $b_2 b_1$, makes a state-transition and outputs three bits, $b_2 b_1 b_0$, which maps to the angle $(4b_2 + 2b_1 + b_0) 2\pi/8$ on the circle. For higher rates, uncoded bits are added as the most significant bits in the natural labeling. For example, 3 bits/T on the P-dimension is transmitted by the angle $((8b_3 + 4b_2 + 2b_1 + b_0) 2\pi/16)$, where $b_3$ is uncoded.

The P-dimension uses the standard 32-state Ungerboeck 2-bits/T 8PSK TCM. The generators in octal form for this encoder are $h^2 = 34$, $h^1 = 16$, $h^0 = 45$. Higher rates may be achieved through uncoded bits that form the most significant positions on a naturally labeled MPSK.

Phase modulations use naturally labeled MPSK constellations. The tables below represent sample mappings for a 2 bits/symbol phase TCM. In the following tables, $b_0$ is the non-systematic coded bit, $b_1$, $b_2$ are the two systematic coded bits, and $b_3$, $b_4$, and $b_5$ are uncoded bits.

Table for 8PSK Mapping

| b2 b1 b0 | angle/$2\pi$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

Table for 16PSK Mapping

| b3 b2 b1 b0 | angle/$2\pi$ |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

Table for 32PSK Mapping

| b4 b3 b2 b1 b0 | angle/$2\pi$ |
|---|---|
| 00000 | 0 |
| 00001 | 1 |
| 00010 | 2 |
| 00011 | 3 |
| 00100 | 4 |
| 00101 | 5 |
| 00110 | 6 |
| 00111 | 7 |
| 01000 | 8 |
| 01001 | 9 |
| 01010 | 10 |
| 01011 | 11 |
| 01100 | 12 |
| 01101 | 13 |
| 01110 | 14 |
| 01111 | 15 |
| 10000 | 16 |
| 10001 | 17 |
| 10010 | 18 |
| 10011 | 19 |
| 10100 | 20 |
| 10101 | 21 |
| 10110 | 22 |
| 10111 | 23 |
| 11000 | 24 |
| 11001 | 25 |
| 11010 | 26 |
| 11011 | 27 |
| 11100 | 28 |
| 11101 | 29 |
| 11110 | 30 |
| 11111 | 31 |

Table for 64PSK Mapping

| b5 b4 b3 b2 b1 b0 | angle/$2\pi$ | b5 b4 b3 b2 b1 b0 | angle/$2\pi$ |
|---|---|---|---|
| 000000 | 0 | 100000 | 32 |
| 000001 | 1 | 100001 | 33 |
| 000010 | 2 | 100010 | 34 |
| 000011 | 3 | 100011 | 35 |
| 000100 | 4 | 100100 | 36 |
| 000101 | 5 | 100101 | 37 |
| 000110 | 6 | 100110 | 38 |
| 000111 | 7 | 100111 | 39 |
| 001000 | 8 | 101000 | 40 |
| 001001 | 9 | 101001 | 41 |
| 001010 | 10 | 101010 | 42 |
| 001011 | 11 | 101011 | 43 |
| 001100 | 12 | 101100 | 44 |
| 001101 | 13 | 101101 | 45 |
| 001110 | 14 | 101110 | 46 |
| 001111 | 15 | 101111 | 47 |
| 010000 | 16 | 110000 | 48 |
| 010001 | 17 | 110001 | 49 |
| 010010 | 18 | 110010 | 50 |
| 010011 | 19 | 110011 | 51 |
| 010100 | 20 | 110100 | 52 |
| 010101 | 21 | 110101 | 53 |
| 010110 | 22 | 110110 | 54 |
| 010111 | 23 | 110111 | 55 |
| 011000 | 24 | 111000 | 56 |
| 011001 | 25 | 111001 | 57 |
| 011010 | 26 | 111010 | 58 |
| 011011 | 27 | 111011 | 59 |
| 011100 | 28 | 111100 | 60 |
| 011101 | 29 | 111101 | 61 |
| 011110 | 30 | 111110 | 62 |
| 011111 | 31 | 111111 | 63 |

A summary of different modulation rate combination in accordance with embodiments of the present invention is presented in the following "Amplitude and Phase Constellation Rate Table".

Amplitude and Phase Constellation Rate Table

| R | $R_P$ | P-Constellation | $R_A$ | A-Constellation, (a, d) |
|---|---|---|---|---|
| 1 | 1 bit/T | 4DPSK, natural | 0 | — |
| 2 | 2 bits/T | 8DPSK, natural | 0 | — |
| 3 | 2 bits/T | 8DPSK, natural | 2 bits/2T | 2x3PAM, (0.446, 0.548) |
| 4 | 3 bits/T | 16DPSK, natural | 2 bits/2T | 2x3PAM, (0.283, 1.026) |
| 5 | 3 bits/T | 16DPSK, natural | 4 bits/2T | 2x6PAM, (0.250, 0.394) |
| 6 | 4 bits/T | 32DPSK, natural | 4 bits/2T | 2x6PAM, (0.174, 0.626) |
| 7 | 4 bits/T | 32DPSK, natural | 6 bits/2T | 2x12PAM, (0.234, 0.306) |
| 8 | 5 bits/T | 64DPSK, natural | 6 bits/2T | 2x12PAM, (0.176, 0.491) |
| 9 | 5 bits/T | 64DPSK, natural | 8 bits/2T | 2x24PAM, (0.130, 0.580) |

In one embodiment, the selected transmission rate depends on the signaling capability of the channel. However, the basic modulation rate of the present invention uses a 32-state 2 bits/T encoder for the phase dimension, and a 16-state 2 bits/2T encoder for the amplitude dimension. Additional bits are added by set partitioning and expanding the constellations as previously discussed.

The table below presents desirable Signal to Noise Ratio (SNR) bins for each rate at a target BER of 5e-4. These approximate values are based on standalone performance of the individual rates. This table illustrates that it may not be desirable to signal over home power lines when SNR is less than approximately 7 dB based on analysis using the minimum signaling rate of 1 bit/T. Those of skill in the art would appreciate that this table does not preclude signalling below SNR of 7 dB.

SNR Bins for Different Signaling Rates

| SNR [dB]. | R |
|---|---|
| (7.0, 10.0) | 1 bit/T |
| (12.0, 15.0) | 2 bits/T |
| (15.0, 19.0) | 3 bits/T |
| (19.0, 23.0) | 4 bits/T |
| (23.0, 25.5) | 5 bits/T |
| (25.5, 27.2) | 6 bits/T |
| (27.2, 30.0) | 7 bits/T |
| (30.0, 33.0) | 8 bits/T |
| (33.0, 36.0) | 9 bits/T |

Multi-Tone Encoding

In an embodiment of the present invention, the multi-tone encoding of data starts with the selection of a set of tones that could support the transmission rate at a given error rate. The table above provides a guideline for achievable rates at BER of approximately 5e-4.

Figure 11:
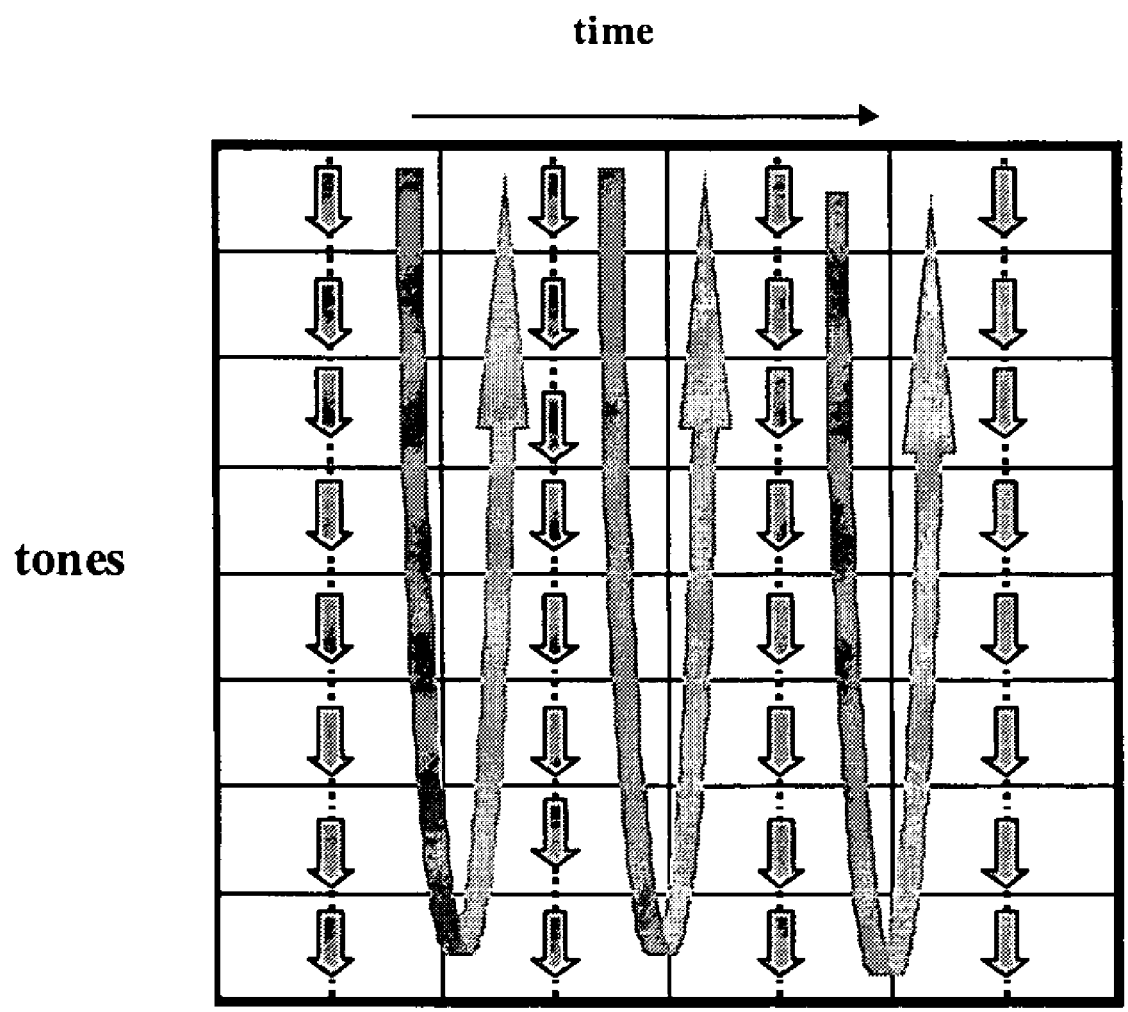
FIG. 11 is an illustration of the encoding process across tones in accordance with embodiments of the present invention.

Once the tones are selected, both encoders start running across tones and over again, as illustrated in FIG. 11. The amplitude encoder determines the pair of amplitudes (for two symbol intervals) for all used tones one after another, and over again; whereas the phase encoder determines the phase on these rings, for all used tones one after another, and over again, cumulatively along the time dimension for each tone.

As an illustration, consider two tones, tone_0 with SNR_0=16 dB and tone_1 with SNR_1=23 dB. Tone_0 supports 3 bits/symbol transmission whereas tone_1 can signal at 5 bits/symbol. Both encoders are at state zero at the beginning of the transmission. Suppose also that the information sequence to be encoded is all ones, 1111111111, just for simplicity. The amplitude on tone_0 will be encoded as 2 bits/2T and on tone_1 as 4 bits/2T.

Starting with tone_0, the encoder takes two information bits (11), transits to state 12 with output label 7 of the 8-point constellation (see FIG. 10): For the next two symbols, the amplitudes on tone_0 will be $d_3$ and $d_3+a_3$ with proper $d_3$, $a_3$ values (see the "2×3PAM 8-Point Amplitude Constellation" table above).

Then tone_1 is next: encoder takes 2 bits (11) to make a transition from state 12 to state 3, and outputs 6 ($f_2 f_1 f_0$=110), the constellation label is formed as $f_4 f_3 f_2 f_1 f_0$=11110 (30) where $f_4 f_3$=11 are two more (uncoded) information bits, since tone_1 transmits 4 bits/2T. For the next two symbols, the amplitudes on tone_1 will be $d_5+3a_5$ and $d_5+3a_5$, with proper $d_5$, $a_5$ (see 2×6PAM 32-Point Amplitude Constellation table above). Back to tone_0, and the encoder will transit from state 3 to state 13 with output label 7.

On the phase dimension, the initial phase reference for differential signaling is set to zero. Tone_0 has 2 bits/T on the phase dimension, upon taking two information bits (11), the encoder transits to state 9 with label 6, which is the angle 6×2×π/8. This is the angle on the first symbol of tone_0. Next comes tone_1, which will have 3 bits/T (one bit is uncoded) on the phase: The phase encoder transits from state 9 to state 31 with label 7 (111), together with $b_3$=1 gives 1111=15 on the 16PSK, which is the angle 15×2×π/16. Back to tone_0, the encoder transits from state 31 to state 20 with a label 7, and the angle on the second symbol of tone_0 will therefore be 6×2×π/8+7×2×π/8=5×2×π/8 (modulo 2π), since it is added to the angle from the previous symbol. Now for tone_1, the encoder transits from state 20 to state 3 with output 6 (110), together with an uncoded bit 1 the label becomes 1110=14, and the angle for the second symbol on the second tone is 15×2×π/16+14×2×π/16=13×2×π/16 (modulo 2π).

FIG. 12 illustrates a two-tone OFDM grid over four symbols. The amplitude encoder outputs the pairs of amplitudes $(A_0,B_0)$, $(A_1,B_1)$, $(A_2,B_2)$, $(A_3,B_3)$ in succession. The phase encoder outputs the phases $\phi_0$, $\phi_1$, $\phi_2$, $\phi_3$, $\phi_4$, $\phi_5$, $\phi_6$, $\phi_7$.

At the receiving end, two Viterbi-decoding operations are performed, one for the P-trellis, and one for the A-trellis. The branch metric for the P-trellis is the squared-Euclidean distance between the unnormalized differential detector output and a unit vector with the angle on the branch:

$$\delta_P^2 = |y_k y_{k-1}^* - e^{j\phi_k}|^2$$

The A-trellis is decoded independently from P-decisions, where the branch metrics uses the most favorable angles possible for that tone over two consecutive symbols.

$$\delta_A^2 = \min_{\phi_1 \in \Phi} |y_{2k+1} - e^{j\phi_1} x_{2k+1}|^2 + \min_{\phi_0 \in \Phi} |y_{2k} - e^{j\phi_0} x_{2k}|^2$$

For phase constellations of 8 points and higher, the discrete minimization over the constellation angles can be approximated by a minimization over the continuum of angles [0,2π) with virtually no loss in performance:

$$\delta_A^2 = ||y_{2k+1}| - |x_{2k+1}||^2 + ||y_{2k}| - |x_{2k}||^2$$

Differential Amplitude and Phase Shift Keying

One or more embodiments of the present invention may use a modulation process referred to as Differential Amplitude and Phase Shift Keying (DAPSK). In Differential Amplitude and Phase Shift Keying modulations, a portion of the data to be transmitted is mapped on an amplitude level and the remainder of the data to a change in phase. Each amplitude level defines a "ring" of potential phase points.

FIG. 14 through FIG. 19 show signal "pseudo-constellations" for each modulation type, where D[0] represents bit 0 (i.e. least significant bit), D[1] represents bit 1, etc. The name "pseudo-constellation" is used because the phases of the points on the constellation refer to phase change and not the actual phase of the signal.

In the illustrations of FIGS. 14-19, the amplitudes of the rings are defined relative to the amplitude of the innermost ring, with the innermost ring having a normalized amplitude of "1". A suitable transmitter scales the resulting constellation to achieve the same average power on each Tone regardless of the modulation density.

Figure 14:
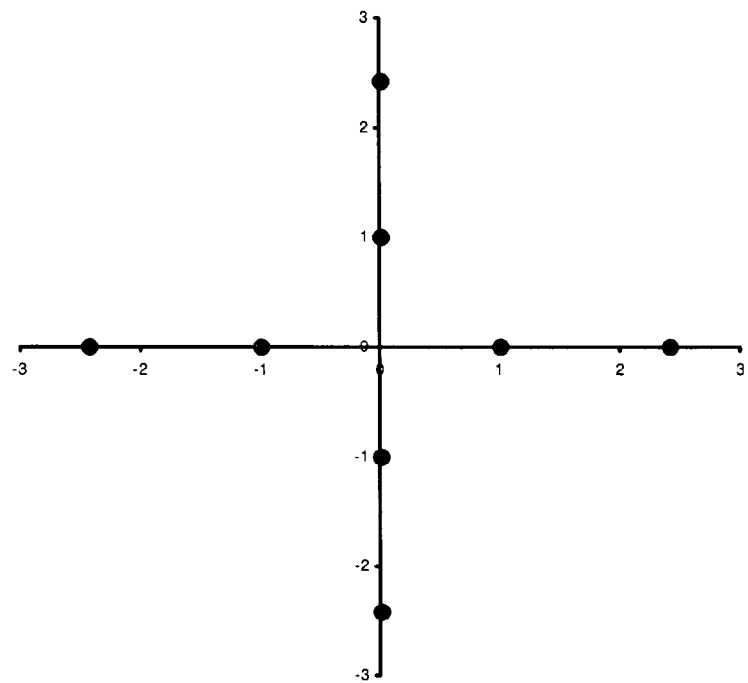
FIG. 14 is an illustration of 8DAPSK constellations.

FIG. 14 is an illustration of 8DAPSK constellations. In this illustration, there are two possible amplitudes with four allowed phase changes at each amplitude level.

Figure 15:
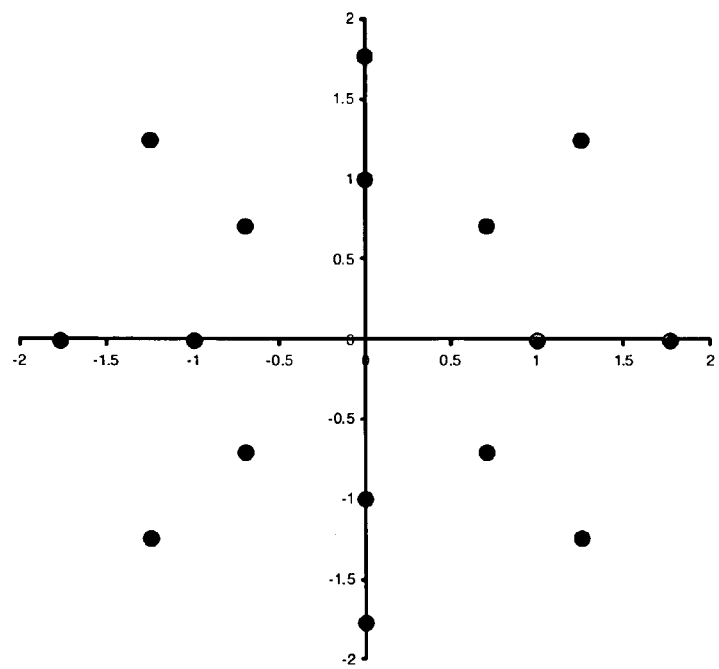
FIG. 15 is an illustration of 16DAPSK constellations.

FIG. 15 is an illustration of 16DAPSK constellations. For 16DAPSK, there are two possible amplitudes with eight allowed phase changes at each amplitude level.

Figure 16:
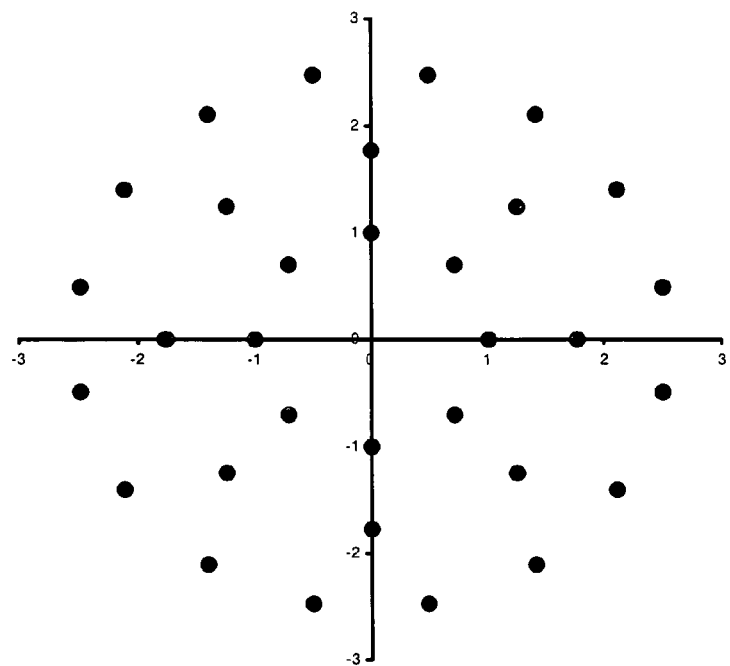
FIG. 16 is an illustration of 32DAPSK constellations.

FIG. 16 is an illustration of 32DAPSK constellations. For 32DAPSK, there are three possible amplitudes with eight allowed phase changes at the inner two rings and 16 phase changes at the outer ring.

Figure 17:
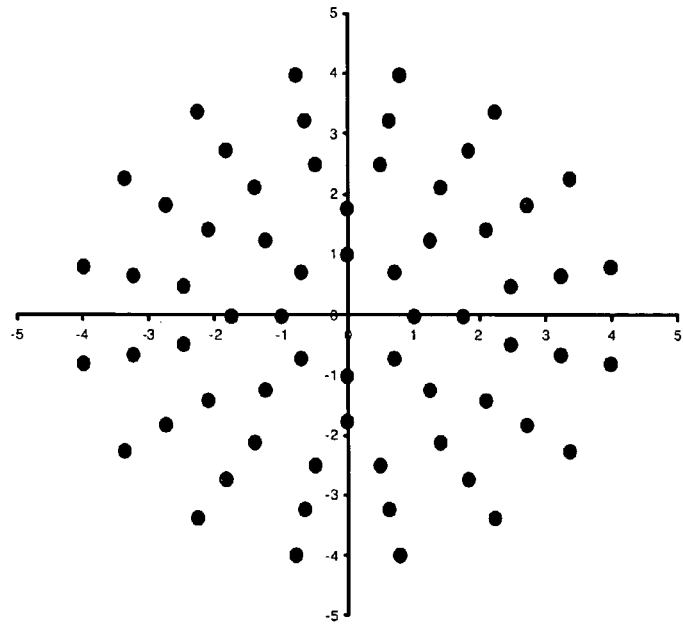
FIG. 17 is an illustration of 64DAPSK constellations.

FIG. 17 is an illustration of 64DAPSK constellations. For 64DAPSK, there are five possible amplitudes with eight allowed phase changes at the inner two rings and 16 phase changes at the outer three rings.

FIG. 18 is an illustration of 128DAPSK constellations. For 128DAPSK, there are seven possible amplitudes with eight allowed phase changes at the inner two rings, 16 phase changes at the middle three rings and 32 allowed phase changes at the outer two rings.

FIG. 19 is an illustration of 256DAPSK constellations. For 256DAPSK, there are eleven possible amplitudes with eight allowed phase changes at the inner two rings, 16 phase changes at the next three rings, and 32 allowed phase changes at the outer six rings.

What is claimed is:

1. A method for robust signaling over a transmission medium, said method comprising:
   obtaining data for transmission over said transmission medium;
   obtaining a transfer function of said transmission medium;
   selecting a data transmission rate using said transfer function;
   selecting a set of tones capable of supporting said transmission rate at a predefined error rate; and
   encoding said data at said data transmission rate, using a plurality of encoders, across said set of tones;
   mapping said data onto a set of concentric circular rings as a plurality of constellation points, wherein each of said rings includes a portion of said plurality of constellation points, and wherein each of said rings has an amplitude relative to the innermost ring defining a ring radius for each of said rings, and wherein each of said constellation points on each of said rings has the same ring radius as other constellation points on the same ring.

2. The method of claim 1, wherein said encoding said data comprises:
   determining a pair of amplitudes from said amplitude of each of said rings for all of said set of tones, wherein said pair of amplitudes is transmitted over two time symbols;
   determining a cumulative phase angle for each of said set of tones from a phase of each of said rings.

3. The method of claim 2, wherein said plurality of encoders comprises an amplitude encoder and a phase encoder.

4. The method of claim 3, wherein said amplitude encoder is a Pulse Amplitude Modulation encoder.

5. The method of claim 3, wherein said phase encoder uses trellis coded modulation.

6. The method of claim 3, wherein said amplitude and said phase are coded independently.

7. The method of claim 1, wherein said transmission medium is subdivided into channels.

8. The method of claim 7, wherein said transfer function is signal-to-noise ratio of each of said channels.

9. The method of claim 1, further comprising:
   decoding said amplitude coherently; and
   decoding said phase differentially.

10. The method of claim 9, wherein said decoding said phase comprises:
    applying symbol-interleaving to break up consecutive phase-delta errors; and
    applying erasures decoding to eliminate unreliable data.

11. A device for robust signaling over a transmission medium, said device comprising:
    a channel gain estimator for determining a transfer function of a transmission medium;
    a rate selector for selecting a data transmission rate using said transfer function;
    a constellation mapper for mapping data to be transmitted over a set of tones capable of supporting said transmission rate at a predefined error rate, wherein the constellation mapper is configured to map said data onto a set of concentric circular rings as a plurality of constellation points, wherein each of said rings includes a portion of said plurality of constellation points, and wherein each of said rings has an amplitude relative to the innermost ring defining a ring radius for each of said rings, and wherein each of said constellation points on each of said rings has the same ring radius as other constellation points on the same ring; and
    a plurality of encoders for encoding said data at said data transmission rate across said set of tones.

12. The device of claim 11, wherein said encoding said data comprises:
    determining a pair of amplitudes from said amplitude of each of said rings for all of said set of tones, wherein said pair of amplitudes is transmitted over two time symbols;
    determining a cumulative phase angle for each of said set of tones from a phase of each of said rings.

13. The device of claim 12, wherein said plurality of encoders comprises an amplitude encoder and a phase encoder.

14. The device of claim 13, wherein said amplitude encoder is a Pulse Amplitude Modulation encoder.

15. The device of claim 13, wherein said phase encoder uses trellis coded modulation.

16. The device of claim 13, wherein said amplitude and said phase are coded independently.

17. The device of claim 11, wherein said transmission medium is subdivided into channels.

18. The device of claim 17, wherein said transfer function is signal-to-noise ratio of each of said channels.

19. The device of claim 11, further comprising:
    a coherent amplitude decoder with or without phase decisions; and
    a differential phase decoder employing symbol-interleaving to break up consecutive phase-delta errors and erasures decoding to eliminate unreliable data.

* * * * *